(12) United States Patent
Wells et al.

(10) Patent No.: US 8,275,544 B1
(45) Date of Patent: Sep. 25, 2012

(54) MAGNETICALLY STABILIZED FORWARD OBSERVATION PLATFORM

(75) Inventors: Randy Louis Wells, Huntsville, AL (US); Rusty Allen Anderson, Huntsville, AL (US); Eugene E. Pinczewski, II, Brownsboro, AL (US); Robert Edward Oakley, Jr., Hunstville, AL (US); Ralph Francis Gesin, Harvest, AL (US); Ruben Rojas, Madison, AL (US)

(73) Assignee: Miltec Missiles & Space, Huntsville, AL (US)

( * ) Notice: Subject to any disclaimer, the term of this patent is extended or adjusted under 35 U.S.C. 154(b) by 516 days.

(21) Appl. No.: 12/533,788

(22) Filed: Jul. 31, 2009

Related U.S. Application Data

(63) Continuation-in-part of application No. 11/285,644, filed on Nov. 21, 2005, now Pat. No. 7,587,277.

(51) Int. Cl.
*G01C 21/02* (2006.01)
(52) U.S. Cl. ......... 701/501; 701/519; 702/151; 342/146
(58) Field of Classification Search ............. 701/220, 701/408, 468, 501, 519; 702/151; 342/146
See application file for complete search history.

(56) References Cited

U.S. PATENT DOCUMENTS

| | | | |
|---|---|---|---|
| 6,361,507 B1 | 3/2002 | Foxlin | |
| 6,489,922 B1* | 12/2002 | Lin et al. | 342/357.32 |
| 6,496,779 B1 | 12/2002 | Hwang | |
| 6,516,283 B2 | 2/2003 | McCall et al. | |
| 6,522,992 B1 | 2/2003 | McCall et al. | |
| 6,882,964 B2 | 4/2005 | Bayard et al. | |
| 6,955,082 B2 | 10/2005 | Adebjork et al. | |
| 7,341,221 B1 | 3/2008 | Wilson | |
| 7,834,300 B2* | 11/2010 | Zemany et al. | 244/3.15 |
| 2003/0146869 A1* | 8/2003 | Lin et al. | 342/357.14 |
| 2007/0010965 A1* | 1/2007 | Malchi et al. | 702/151 |
| 2007/0032951 A1 | 2/2007 | Tanenhaus et al. | |
| 2007/0205320 A1* | 9/2007 | Zemany et al. | 244/3.16 |
| 2009/0125163 A1* | 5/2009 | Duggan et al. | 701/2 |
| 2011/0130913 A1* | 6/2011 | Duggan et al. | 701/23 |

OTHER PUBLICATIONS

DFOISR #04-s-0689, "Proposed IEEE Inertial Systems Terminology Standard and Other Inertial Sensor Standards" by Randall K. Curey et al., pp. 1-9, undated.

(Continued)

*Primary Examiner* — Mark Hellner
(74) *Attorney, Agent, or Firm* — Lathrop & Gage LLP

(57) ABSTRACT

A system and method for determining a position of a remote object comprising inertial sensors and three axis magnetic sensor, together with a target sighting device aligned with the observation platform to determine a target line of sight and a target range finder to determine a distance to the target along the line of sight. A GPS receiver may be included for determining an observation platform position and orientation, The three axis magnetic sensor provides both magnetic north and vertical attitude information for improved rapid initialization and operation in motion. Magnetic anomaly information is detected by comparing IMU and magnetic navigation information and by other methods. Target identification may be determined by a human operator and/or by computer. The system may be integrated with a weapon system to use weapon system sights. The system may be networked to provide target location and/or location error information to another identical unit or a command information system.

24 Claims, 27 Drawing Sheets

OTHER PUBLICATIONS

Printout dated Sep. 13, 2005from web page from www.sensorsmag.com Sensors Magazine Online, Sep. 2003, Sensors Online, Sensor Technology and Design, entitled "A Unique Angular-Rate-Sensing Gyro" pp. 1-5, dated Sep. 2003.

Printout dated Sep. 13, 2005 from web page from www.sensorsmag.com Sensors Magazine Online, Aug. 2002 Putting Sensors to Work entitled "MEMS Sensors in Virtual Reality" pp. 1-7, dated Aug. 2002.

"An Inertial Measurement Framework for Gesture Recognition and Applications" by Ari Y. Benbasat et al, pp. 9-20, dated 2002.

IMU-E604 Manual, Revision G. entitled "Inertial Measurement Unit, Owner's Manual Part No. IMU-E604" pp. 1-32, dated Oct. 22, 2000.

Printout dated Sep. 13, 2005 from web page from www.gpsworld.com GPS World—From View to Kill, entitled "Integrated System Guides Ballistic Missile Intercept", pp. 1-5, dated May 1, 2003.

Inertial Science, Inc. entitled Inertial Measurement Unit (IMU) ISIS-IMU (Rev. C), Application Control #Z271590, undated.

Select File History from related U.S. Patent No. 7,587,277, dated Jun. 6, 2008 through Jun. 16, 2009, 53 pages.

* cited by examiner

Row 1-3 $\left\{ \begin{bmatrix} 1 & 0 & 0 \\ 0 & 1 & 0 \\ 0 & 0 & 1 \end{bmatrix} \right.$
Col 4-6

Row 4-6 $\left\{ T_b^N * \begin{bmatrix} 0 & a_b^z & a_b^y \\ a_b^z & 0 & a_b^x \\ a_b^y & a_b^x & 0 \end{bmatrix} \right.$
Col 7-9

$T_b^N$ — 1006
Col 25-27

Row 4-6 $\left\{ T_b^N * \begin{bmatrix} a_b^x & 0 & 0 \\ 0 & a_b^y & 0 \\ 0 & 0 & a_b^z \end{bmatrix} \right.$
Col 28-30

$T_b^N * \begin{bmatrix} a_b^y & a_b^z & 0 & 0 & 0 & 0 \\ 0 & 0 & a_b^z & a_b^x & 0 & 0 \\ 0 & 0 & 0 & 0 & a_b^x & a_b^y \end{bmatrix}$ — 1010
Col 31-36

Fig. 10A $$\text{Row 7-9} \begin{cases} 1012 \\ \begin{bmatrix} 0 & \omega_n^z & \omega_n^y \\ \omega_n^z & 0 & \omega_n^x \\ \omega_n^y & \omega_n^x & 0 \end{bmatrix} \\ \text{Col 7-9} \end{cases} \quad T_b^N \overset{1014}{\phantom{=}} \quad T_b^N * \begin{bmatrix} \omega_b^x & 0 & 0 \\ 0 & \omega_b^y & 0 \\ 0 & 0 & \omega_b^z \end{bmatrix}^{1016} \\ \text{Col 10-12} \quad \text{Col 13-15}$$

$$\text{Row 7-9} \begin{cases} 1018 \\ T_b^N * \begin{bmatrix} a_b^x & 0 & 0 \\ 0 & a_b^y & 0 \\ 0 & 0 & a_b^z \end{bmatrix} \\ \text{Col 16-18} \end{cases} \quad T_b^N * \begin{bmatrix} \omega_b^y & \omega_b^z & 0 & 0 & 0 & 0 \\ 0 & 0 & \omega_b^z & \omega_b^x & 0 & 0 \\ 0 & 0 & 0 & 0 & \omega_b^x & \omega_b^y \end{bmatrix}^{1020} \\ \text{Col 19-24}$$

Fig. 10B $$H = \begin{bmatrix}
LOS_x^{Sat1} & LOS_y^{Sat1} & LOS_z^{Sat1} \\
LOS_x^{Sat2} & LOS_y^{Sat2} & LOS_z^{Sat2} \\
LOS_x^{Sat3} & LOS_y^{Sat3} & LOS_z^{Sat3} \\
LOS_x^{Sat4} & LOS_y^{Sat4} & LOS_z^{Sat4} \\
LOS_x^{Sat5} & LOS_y^{Sat5} & LOS_z^{Sat5} \\
LOS_x^{Sat6} & LOS_y^{Sat6} & LOS_z^{Sat6} \\
LOS_x^{Sat7} & LOS_y^{Sat7} & LOS_z^{Sat7} \\
LOS_x^{Sat8} & LOS_y^{Sat8} & LOS_z^{Sat8} \\
LOS_x^{Sat9} & LOS_y^{Sat9} & LOS_z^{Sat9} \\
LOS_x^{Sat10} & LOS_y^{Sat10} & LOS_z^{Sat10} \\
LOS_x^{Sat11} & LOS_y^{Sat11} & LOS_z^{Sat11}
\end{bmatrix}$$

- 1202: (1,12) to (3,17) = zero
- Columns 4 to 6 = zero
- 1204: (7,1) to (9,11) = zero, with block:
$$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 9.81 & 0 \\ 0 & -9.81 & 0 & 0 & 0 & 0 \end{bmatrix}$$
- Columns 10 – 36 = zero
- 1206: speed of light (×9 entries); (37,12) To (37,17) = zero

Fig. 12

$$H = \begin{pmatrix}
0.4777071 & 0.850439 & 0.7655307 & 0 & 0 & 0 & 0 & 299792500 \\
0.5089959 & 0.2442468 & 0.6996238 & 0 & 0 & 0 & 0 & 299792500 \\
0.3486146 & 0.3771033 & 0.6960882 & 0 & 0 & 0 & 0 & 299792500 \\
0.7195044 & -0.2366673 & 0.3454611 & 0 & 0 & 0 & 0 & 299792500 \\
-0.6526722 & 0.5741943 & 0.0926879 & 0 & 0 & 0 & 0 & 299792500 \\
-0.4657919 & 0.951076 & 0.7647207 & 0 & 0 & 0 & 0 & 299792500 \\
-0.2304494 & -0.1370412 & 0.7924960 & 0 & 0 & 0 & 0 & 299792500 \\
-0.7540268 & 0.2648274 & 0.2098631 & 0 & -1 & 0 & 0 & 299792500 \\
0.5410494 & 0.330770 & 0.7219608 & 0 & 0 & -9.81 & 0 & 299792500 \\
-0.5731341 & 0.727156 & 0.6956152 & 0 & 0 & 0 & -1 & 299792500 \\
0.5769109 & 0.4752780 & 0.4451285 & 0 & 0 & 0 & 0 & 299792500 \\
0 & 0 & 0 & 0 & 0 & 0 & 0 & 0 \\
0 & 0 & 0 & 0 & -9.81 & 0 & 0 & 0 \\
0 & 0 & 0 & 0 & 0 & 0 & 0 & 0 \\
0 & 0 & 0 & 0 & 0 & 0 & 0 & 0 \\
\end{pmatrix}$$

$$\underbrace{\phantom{XX}1\phantom{XX}}_{1202}\ \underbrace{\phantom{XX}2\phantom{XXXX}3\phantom{XX}}_{}\ \underbrace{\phantom{XX}4\text{-}6\phantom{XX}}_{}\ \underbrace{\phantom{X}7\phantom{XX}8\phantom{XX}9\phantom{X}}_{1204}\ \underbrace{\phantom{X}10\text{-}36\phantom{X}}_{}\ \underbrace{\phantom{XX}37\phantom{XX}}_{1206}$$

Fig. 13

$$R = \begin{pmatrix} 25 & 0 & 0 & 0 & 0 & 0 & 0 & 0 & 0 & 0 & 0 & 0 & 0 & 0 & 0 \\ 0 & 25 & 0 & 0 & 0 & 0 & 0 & 0 & 0 & 0 & 0 & 0 & 0 & 0 & 0 \\ 0 & 0 & 25 & 0 & 0 & 0 & 0 & 0 & 0 & 0 & 0 & 0 & 0 & 0 & 0 \\ 0 & 0 & 0 & 25 & 0 & 0 & 0 & 0 & 0 & 0 & 0 & 0 & 0 & 0 & 0 \\ 0 & 0 & 0 & 0 & 25 & 0 & 0 & 0 & 0 & 0 & 0 & 0 & 0 & 0 & 0 \\ 0 & 0 & 0 & 0 & 0 & 25 & 0 & 0 & 0 & 0 & 0 & 0 & 0 & 0 & 0 \\ 0 & 0 & 0 & 0 & 0 & 0 & 25 & 0 & 0 & 0 & 0 & 0 & 0 & 0 & 0 \\ 0 & 0 & 0 & 0 & 0 & 0 & 0 & 25 & 0 & 0 & 0 & 0 & 0 & 0 & 0 \\ 0 & 0 & 0 & 0 & 0 & 0 & 0 & 0 & 25 & 0 & 0 & 0 & 0 & 0 & 0 \\ 0 & 0 & 0 & 0 & 0 & 0 & 0 & 0 & 0 & 25 & 0 & 0 & 0 & 0 & 0 \\ 0 & 0 & 0 & 0 & 0 & 0 & 0 & 0 & 0 & 9.4088ee{-}6 & 0 & 0 & 0 & 0 & 0 \\ 0 & 0 & 0 & 0 & 0 & 0 & 0 & 0 & 0 & 0 & 1.149e{-}5 & 0 & 0 & 0 & 0 \\ 0 & 0 & 0 & 0 & 0 & 0 & 0 & 0 & 0 & 0 & 0 & 5.02269e{-}5 & 0 & 0 & 0 \\ 0 & 0 & 0 & 0 & 0 & 0 & 0 & 0 & 0 & 0 & 0 & 0 & 9.622e{-}5 & 0 & 0 \\ 0 & 0 & 0 & 0 & 0 & 0 & 0 & 0 & 0 & 0 & 0 & 0 & 0 & 9.622e{-}5 & 0 \\ 0 & 0 & 0 & 0 & 0 & 0 & 0 & 0 & 0 & 0 & 0 & 0 & 0 & 0 & 9.622.e{-}5 \end{pmatrix}$$

Fig. 15

$$Z = \begin{bmatrix} z - H\hat{x} & z - H\hat{x} & z - H\hat{x} & z - H\hat{x} & z - H\hat{x} & z - H\hat{x} & z - H\hat{x} & z - H\hat{x} & z - H\hat{x} & z - H\hat{x} & z - H\hat{x} & Z^x_{mag} & Z^y_{mag} & Z^z_{mag} & z - H\hat{x} & z - H\hat{x} & z - H\hat{x} \end{bmatrix}$$

1700

MAGNETICALLY STABILIZED FORWARD OBSERVATION PLATFORM

RELATED APPLICATIONS

This application is a continuation-in-part of prior U.S. patent application Ser. No. 11/285,644 entitled: "Inertial/Magnetic Measurement Device" filed Nov. 21, 2005 now U.S. Pat. No. 7,587,277 by Wells, the contents of which are hereby incorporated herein by reference in their entirety.

FIELD OF THE INVENTION

The disclosed embodiments pertain generally to the field of remote target position determination and mapping, more particularly to a system and method of using a three axis magnetic sensor to enable accurate target positioning using a miniature IMU and rangefinder.

BACKGROUND OF THE INVENTION

Currently, target location devices fall into three categories, independent units, integrated command fire units (CFU), and simple range finders. The independent units are typically heavy units requiring vehicle or tripod mount for operation. Simple range finders are light weight, often resembling binoculars, but lack the ability to determine accurate azimuth and elevation angles or to communicate target information. Typical command fire units for weapons such as shoulder launched missiles may include an embedded range finder, and are adequate for acquisition track and launch, but do not have the ability to develop target coordinate information and to communicate that information to other units for coordinated firing or intelligence activities. The technologies typically employed in target location devices typically result in large, heavy units that preclude integration with light weapons like shoulder launched missiles. Exemplary target location devices include the LRAS3 or the ITAS from Rockwell. Both systems are very heavy tripod mounted device weighing over 50 kg, far to cumbersome to integrate with small weapons like shoulder fired weapons or to be operated from a free standing position.

BRIEF DESCRIPTION OF THE INVENTION

Briefly, the disclosed embodiments relate to a system and method for determining a position of a remote object comprising a compact, relatively low performance inertial measurement unit compensated by a three axis magnetic sensor in combination with a GPS receiver for determining an observation platform position and orientation. A target sighting device determines a line of sight vector to the target, and in one embodiment, a range finder determines range. The three axis magnetic sensor provides both magnetic north and attitude information for improved rapid initialization and operation while the observation platform is in motion. Magnetic anomaly information is detected by comparing IMU and magnetic navigation information. Target identification may be determined by a human operator and/or by computer. The system may be integrated with a weapon system to use weapon system sights. The system may be networked to provide target location and/or location error information to another identical unit or a command information system.

In one aspect, embodiments of the system may use a low cost Micro-Electro-Mechanical System (MEMS) Inertial Measurement Unit (IMU) comprising a three axis MEMS rate gyro triad and a three axis MEMS accelerometer triad. Rate gyro bias errors in both azimuth and elevation may be reduced by observing the three axis magnetic sensor information.

In another aspect, embodiments of the system may use a state estimation process, such as for example a Kalman filter, to combine magnetic sensor information and IMU information. The state estimation process may include but is not limited to a Bayesian estimator, a Kalman estimator, a maximum likelihood estimator, or a mean square estimator.

In a further aspect, the state estimation process combines data from the triad of rate gyros and the triad of accelerometers with data from the three axis magnetic sensor to generate platform attitude information; said state estimation process utilizes three axes of the three axis magnetic sensor to correct errors in the platform attitude information.

In a further aspect, a method includes the step of comparing said navigation frame representation of the earth's magnetic vector to a reference magnetic vector to generate a three dimensional comparison value; and correcting the vertical attitude estimate based on said three dimensional comparison value.

In a further aspect, the level sensor and three axis magnetic sensor provide redundant vertical information that cooperates to generate elevation axis information for said line from said reference platform to said target.

In a further aspect, wherein the state estimation process is a Kalman estimator configured to estimate attitude error, an attitude residual is calculated based on a normalized vector cross product between a body referenced three axis magnetic measurement transformed to a navigation frame and a reference navigation frame magnetic vector.

In a further aspect, process embodiments include a Kalman gain adjustment for observability of the attitude error based on a comparison between an uncertainty value for each magnetic axis and the measured magnitudes of the other two axes of the three axis magnetic sensor.

In a further aspect, the gain adjustment is provided by setting the magnetic sensor values for a Kalman measurement covariance matrix according to said comparison between said uncertainty value and said measured magnitudes.

In another aspect, embodiments of the system may utilize GPS information to establish a platform position. GPS information may be further used to determine platform velocity.

In a further embodiments, a state estimation filter may be used to combine GPS navigation information with IMU navigation information and magnetic sensor information to determine platform position, attitude and velocity.

In a further aspect, embodiments of the system may identify a stationary condition of the platform, and utilize the stationary condition to measure gyro and/or accelerometer bias; wherein the system uses the measured gyro and/or accelerometer bias to correct gyro information and/or accelerometer information when the platform is no longer stationary.

In a further aspect, embodiments of the system may utilize three axis magnetometer information to measure gyro and/or accelerometer bias; wherein the system uses the measured gyro and/or accelerometer bias to correct gyro information and/or accelerometer information when the platform is no longer stationary.

In a further aspect, embodiments of the system may utilize three axis magnetometer information while the system is in motion to correct gyro bias information in accordance with the observability of each gyro axis relative to the earth's magnetic vector.

In a further aspect, embodiments of the system may obtain magnetic north correction information from a map database.

The map database may be associated with the GPS receiver. Alternatively, magnetic north correction may be entered manually or determined by observing known surveyed targets.

In a further aspect, embodiments of the system may detect a local or temporary magnetic anomaly by observing a deviation from IMU attitude and magnetic attitude information. Such local magnetic anomalies may be generated by nearby vehicles or equipment. Upon detection of local anomalies, the system may warn the operator of potential errors and track through the event by relying less heavily on magnetic sensor information.

In a further aspect, embodiments of the system may utilize two or more spaced GPS antennas to determine attitude angles. GPS determined attitude angles may be used to initialize IMU attitude information or to stabilize IMU attitude information.

In a further aspect, embodiments of the system may be integrated with a weapon system to use components of the weapon system. Such shared components may include target sighting devices, computer resources, and operator displays. The system may be configured to be detachable from the weapon system to be operated independently.

In a further aspect, embodiments of the system may be networked with another identical system or with a command network. When integrated with a command fire control system, two identical integrated systems may be used to coordinate firing or to direct fire of either integrated system from either integrated system. The integrated system may be used to locate a first target and provide remote targeting position information for the first target while directing one's own weapon to a second target. A second integrated system may receive target location from a first integrated system and display pointing and range commands to the operator of the second integrated system.

These and further benefits and features are herein described in detail with reference to exemplary embodiments in accordance with the invention.

BRIEF DESCRIPTION OF THE FIGURES

The disclosed embodiments are described with reference to the accompanying drawings. In the drawings, like reference numbers indicate identical or functionally similar elements. Additionally, the left-most digit(s) of a reference number identifies the drawing in which the reference number first appears.

FIG. 10 illustrates an exemplary phi matrix, alternatively referred to as the state transition matrix.

FIG. 12 illustrates an exemplary H matrix, alternatively referred to as a measurement observation matrix.

FIG. 13 illustrates a typical numerical example of the H matrix of FIG. 12.

FIG. 15 illustrates a typical numerical example for the R matrix of FIG. 14.

DETAILED DESCRIPTION OF THE INVENTION

Figure 1:
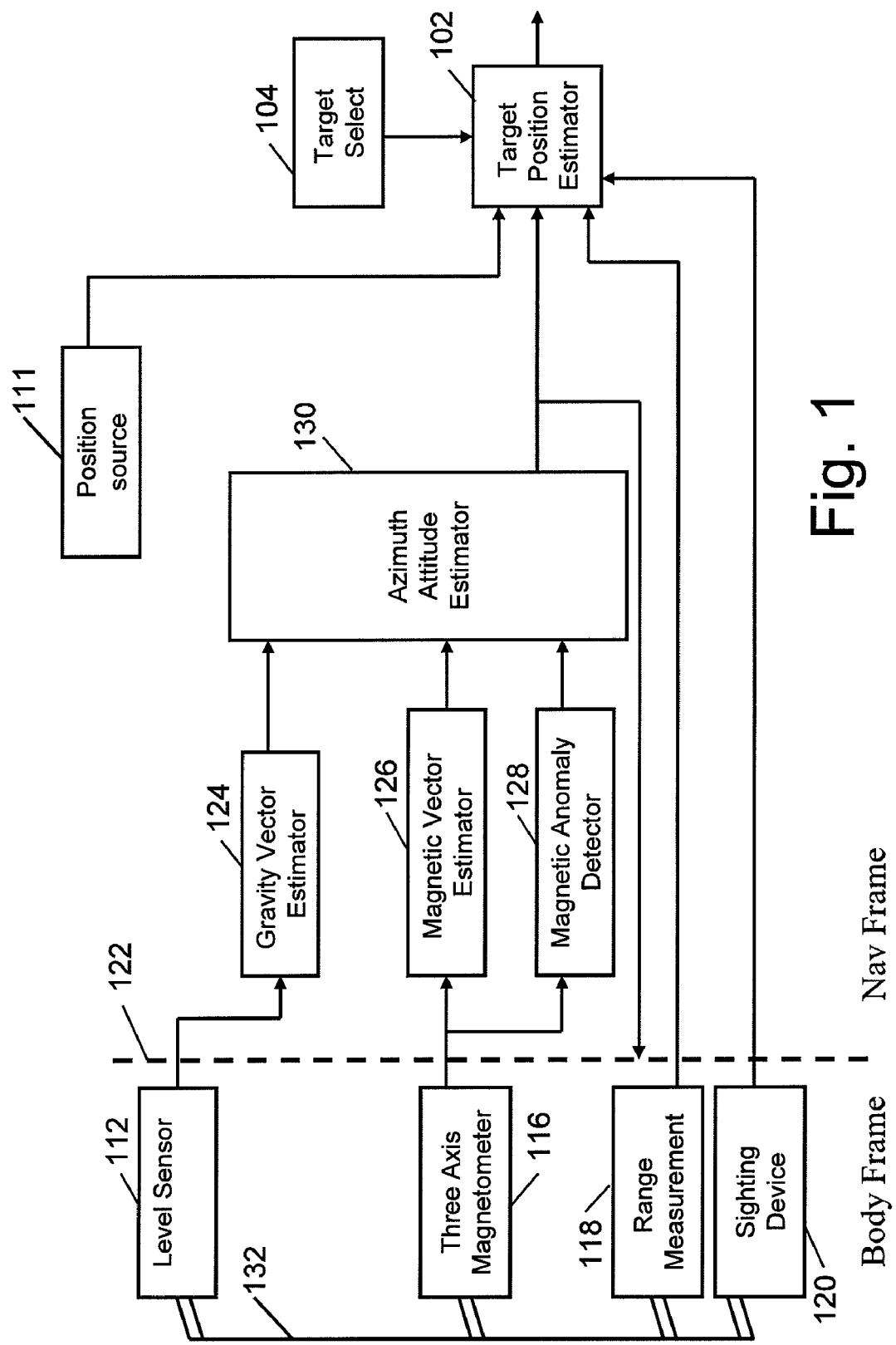
FIG. 1 is a notional block diagram for an exemplary target location system in accordance with embodiments.

It has been recognized that there is a need for a target position measuring device that may be operated on the move or from a free standing position. The device should be light weight enough to be integrated into soldier carried equipment without overburdening and low cost enough to afford wide distribution and use.

Disclosed is a system and method that enables accurate remote target position determination using a light weight, low cost, navigation unit together with a directed range finder. The system utilizes a three axis magnetic sensor in combination with a level sensor to determine elevation attitude in the presence of lateral accelerations that can disrupt gravitational level measurements alone. With the addition of rate gyros, the three axis magnetic sensor may further stabilize bias errors in the gyros to enable accurate pointing angle measurement of a target sighting device and rangefinder. The system may be combined with GPS for additional position and navigation information.

One embodiment is based on a MEMS IMU that is aided by GPS and three axis magnetometer readings. The MEMS IMU is selected for its miniature size, light weight, low power, and low cost. However, due to inherently high bias drifts, g-sensitivity, and noise, data from the MEMS inertial sensors is blended (typically through a Kalman filter) with non-inertial data such as GPS satellite signals and local three dimensional magnetic measurements. In a further embodiment, GPS pseudorange data is used to maintain position accuracy while GPS signal phase data may be processed for platform pitch and yaw information. The three axis magnetometer is used to improve pitch and yaw accuracies as well as roll accuracy. Magnetic aiding algorithms are used to provide attitude drift damping of the MEMS gyros in the presence of distorted magnetic fields. A full featured embodiment combines multiple redundant sensors to maintain high performance in adverse conditions and detect and alert the operator of potential performance degradation and corrective action.

The features of the invention enable a target position measurement system that results in a small size, light weight device that can be integrated into devices and applications heretofore not considered. The position measurement system may now be built in about a kilogram mass or less, whereas previous systems occupied a suitcase size box or more. Thus, the system can now be integrated into shoulder launched weapons or deployed alone as helmet mounted devices or hand held devices similar in size to binoculars.

In one embodiment, the small size allows the target position determination system to be integrated into a command firing unit (CFU), such as for a shoulder launched missile. The CFU may include an optical visible and/or infrared imaging system to support target acquisition in day or night environments. Since the imaging process is passive, these thermal sights could be used as a stand-alone surveillance system for locating targets. With the addition of the navigation and ranging components, these systems could determine mapped target coordinate locations and communicate these locations to others for surveillance or coordinated fire. Information regarding the target's location would be very helpful in those critical situations where multiple operators are searching the same target.

Benefits

The position measurement system utilizes magnetometer and GPS aiding to enable the use of small low cost inertial sensors for observer position and attitude measurement. Magnetometer aiding provides direct azimuth and attitude information that, together with gravity information, fully specifies the local coordinate frame. The earth's magnetic field vector typically has a vertical component that potentially provides redundant information about the vertical axes to augment vertical sensing by gravity. Thus, when gravity vector sensing is disrupted by lateral acceleration such that the gravity vector cannot be measured accurately, the magnetic information can take over and provide accurate stable vertical information that is immune to acceleration.

The system may be further improved by adding one or more, and preferably three axes of gyro information to sense dynamic rotations when the system is not fixed to the ground. The magnetic sensors may further improve the gyro performance by reducing or constraining gyro drift and thus permit small, low cost gyros to be used, thereby enabling new configurations and applications.

Magnetometer aiding is further improved by detection of magnetic disturbances and anomalies. Magnetic north may be generally corrected according to known mapped data, typically provided as table data based on latitude and longitude. In one embodiment, the magnetic correction table data may be associated with or provided by the GPS receiver. Next, field distortions may be corrected to account for hard and soft errors. Hard errors being due to nearby magnetized material and soft errors being due to nearby high permeability unmagnetized material (e.g. steel or iron associated with vehicles or equipment). Algorithms are provided for short term disturbances and long term disturbances.

GPS aiding provides accurate position and velocity information for the observation platform. The position and velocity information may also be used to measure and correct gyro and accelerometer bias and other errors, effectively improving the IMU performance and enabling improved inertial attitude measurements. GPS navigation may also be used to survey markers to be used in the determination of magnetic north correction.

Combined magnetic and GPS aiding provides accurate position, velocity and attitude information in the presence of platform motion. In conventional systems, platform motion can cause uncertainties in attitude due to lateral acceleration causing deviations in a level sensor. Platform motion can be caused by motions of a human operator maintaining his balance while holding and pointing the device. Conventional laser rangefinders may use a tripod mount to stabilize the unit while in operation. Here, however, the device can be handheld, both because of its ability to determine attitude in the presence of lateral motion and because of its small size, both features enabled by the use of three-axis magnetic information.

Combined GPS, and three axis magnetic aiding of the IMU provides synergistic performance gains by covering weaknesses in any one sensor with the combination redundancy of the other sensors. The performance gains allow smaller size sensors, which enables hand held and portable operation as well as integration in other portable devices that was not heretofore thought practical.

To illustrate the small size achievable as disclosed herein, a representative example of each component is given in Table 1. With respect to the IMU, note that the MEMS IMU can deliver a 20 degree per hour gyro bias along with a 1 mg accurate accelerometer in a very small package. A system not relying on a magnetometer might require a gyro with a 0.1 degree per hour bias and an order of magnitude or more greater size and cost. GPS receivers range from very small boards to complete receivers. The GPS receiver of Table 1 is a high performance, wide temperature receiver. Smaller sizes are available. The laser range finder and optical sight is the largest component shown. The size is primarily a consequence of the 7×50 binocular optics provided. In an embodiment where the location capability is added to an existing system, such as a shoulder fired missile, the laser range finder and optical sight of the existing system could be shared, not requiring the addition of the LRF/sight in the table.

The earth's magnetic field has a typical magnitude of approximately 0.5 gauss over much of the earth's surface. In a preferred embodiment, the magnetic sensor may have a linear dynamic range in excess of the earth's magnetic field to accommodate anomalies within the linear range. A linear range of 6 gauss is found to be desirable.

TABLE 1

Typical System Components

| Typical IMU specifications: | |
|---|---|
| Size | 2.5 × 2.5 × 2.5 cm |
| gyro Maximum rate | 180 deg/sec |

TABLE 1-continued

Typical System Components

| | |
|---|---|
| gyro bias | 20 deg/hr |
| gyro random walk | 2 deg/rt hr |
| Accelerometer maximum | 50 g |
| Accelerometer bias | 1 mg |
| Acelerometer random walk | 1 mg/rt hr |
| Typical GPS specifications | |
| Size | 7.5 × 7.5 × 2.5 cm |
| 1 sigma accuracy | 5 meters SA off |
| 1 sigma accuracy | 25 meters SA on |
| Typical LRF/sight specifications | |
| Size | 20 × 15 × 8 cm |
| maximum range | 4 km |
| accuracy | 1 m |
| Objective | 7 × 50 |
| Typical magnetic sensor | |
| Size | 2 × 2 × 1 cm |
| Maximum linear range | 6 gauss |
| noise | 1 milligauss in a 10 Hz bandwidth. |

DETAILED DESCRIPTION OF THE PREFERRED EMBODIMENTS

FIG. 1 is a notional block diagram for an exemplary target location system. Referring to FIG. 1, the system comprises a three axis magnetic sensor 116 and level sensor 112 mounted to a reference platform 132. The three axis level sensor 112 provides input to a gravity vector estimator 124 providing gravity vector information and the three axis magnetic sensor 116 provides input to a magnetic vector estimator 126 and a magnetic anomaly detector 128. The gravity vector and magnetic vector are combined in an azimuth/attitude estimator 130 to determine a three axis attitude estimate comprising a magnetic azimuth and pitch and roll axis information. The attitude information is used to control a coordinate transformation process 122 from body frame coordinates to navigation frame coordinates. Attitude is the set of angles required to define platform orientation in space. Line of sight to the target is measured relative to the platform. Thus, line of sight in space (nav frame) is determined by adding the relative line of sight angle to the platform angle. Vertical attitude is typically the angles about axes perpendicular to the earth's local gravity vector. Azimuth is typically the compass rose angle about the earth's gravity vector. Attitude is sometimes used to include both vertical attitude and azimuth. Numerous coordinate systems are in use in the art, and a specific implementation may use any convenient coordinate system. The use of any particular exemplary coordinate system in this specification is not intended to be limiting. The location system further includes a target sighting device 120 and laser range finder 118 for identifying and measuring range to the target. The sighting device may also indicate target offset from the line of sight. A target position estimator 102 combines attitude, range, and sighting offset information with observer position information 111 to determine the target position coordinates. Observer position is the position of the target location system reference platform and may be entered by the operator or determined by a navigation device. One embodiment further includes a GPS receiver for determining observer position. In operation, the operator observes the target centered or otherwise positioned and designated in the sighting device and then presses a switch 104 to trigger a range measurement and complete a target position calculation. The target position coordinates may then be used locally for fire control or may be communicated to other units.

Figure 2:
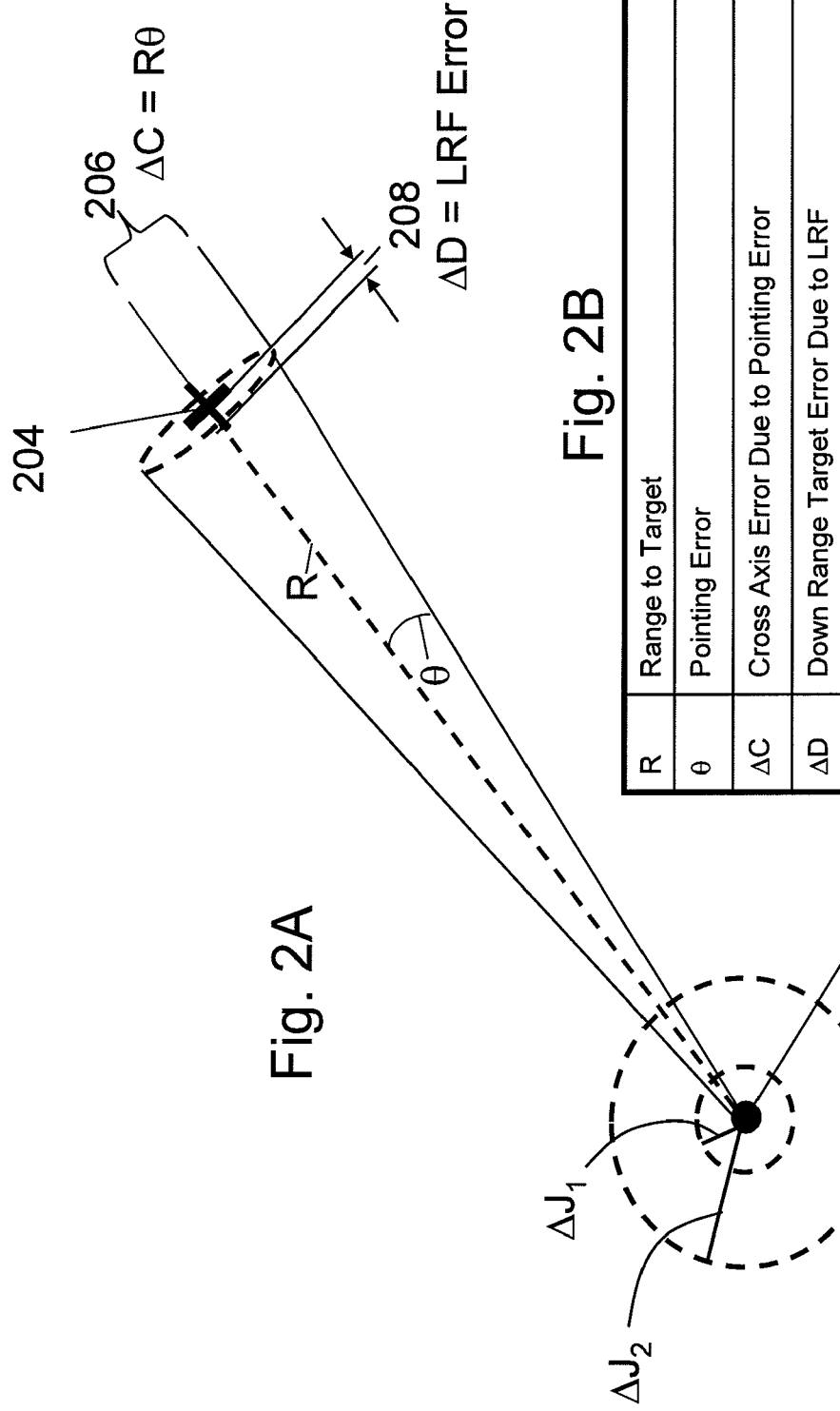
FIG. 2A and FIG. 2B depict the errors in a typical target position measurement for the system of FIG. 1.

FIG. 2A and FIG. 2B depict the errors in a typical target position measurement for the system of FIG. 1. FIG. 2A is a geometrical diagram showing the positioning, attitude, and range error buildup. FIG. 2B is a legend for the symbols of FIG. 2A. Referring to FIG. 2A and FIG. 2B, the total error is determined in a statistical sense. The observation platform, including the instrument of FIG. 1, is located at point 202. The target is at location 204. Dotted line R represents a line of sight from the instrument at point 202 to the target at point 204.

The total error results from the combination of an initial position error for the observation platform, represented by radius $\Delta J1$ or $\Delta J2$, the pointing error $\theta$, and the range measurement error $\Delta D$. The pointing error $\theta$, represents a combination of all attitude errors, i.e., azimuth, pitch, and roll. The initial navigation positioning error is shown for two alternatives. $\Delta J_1$ represents a typical navigation error for a high performance GPS receiver operated with selective availability (SA) off. (SA is a GPS feature wherein the US Government may add random error to the GPS system to frustrate a potential enemy. US military units can ignore SA in wartime. SA is presently off in peacetime.) $\Delta J_2$ represents a larger error radius for a lower performance receiver or a receiver subject to SA with SA on. $\Delta J_1$ and $\Delta J_2$ should include consideration of all three dimensions, including altitude. A more precise model may be based on a particular satellite configuration and may be unequal for the three dimensions.

The pointing error at range R results in a cross axis error $\Delta C = R\theta$. $\Delta D$ represents a mean error (standard deviation) for the range to target measurement. Thus, the total error in the lateral and longitudinal directions may be calculated as:

$$\Delta P_{T(lateral)} = \sqrt{\Delta C^2 + \Delta J^2}$$

$$\Delta P_{T(longitudinal)} = \sqrt{\Delta D^2 + \Delta J^2}$$

Figure 3:
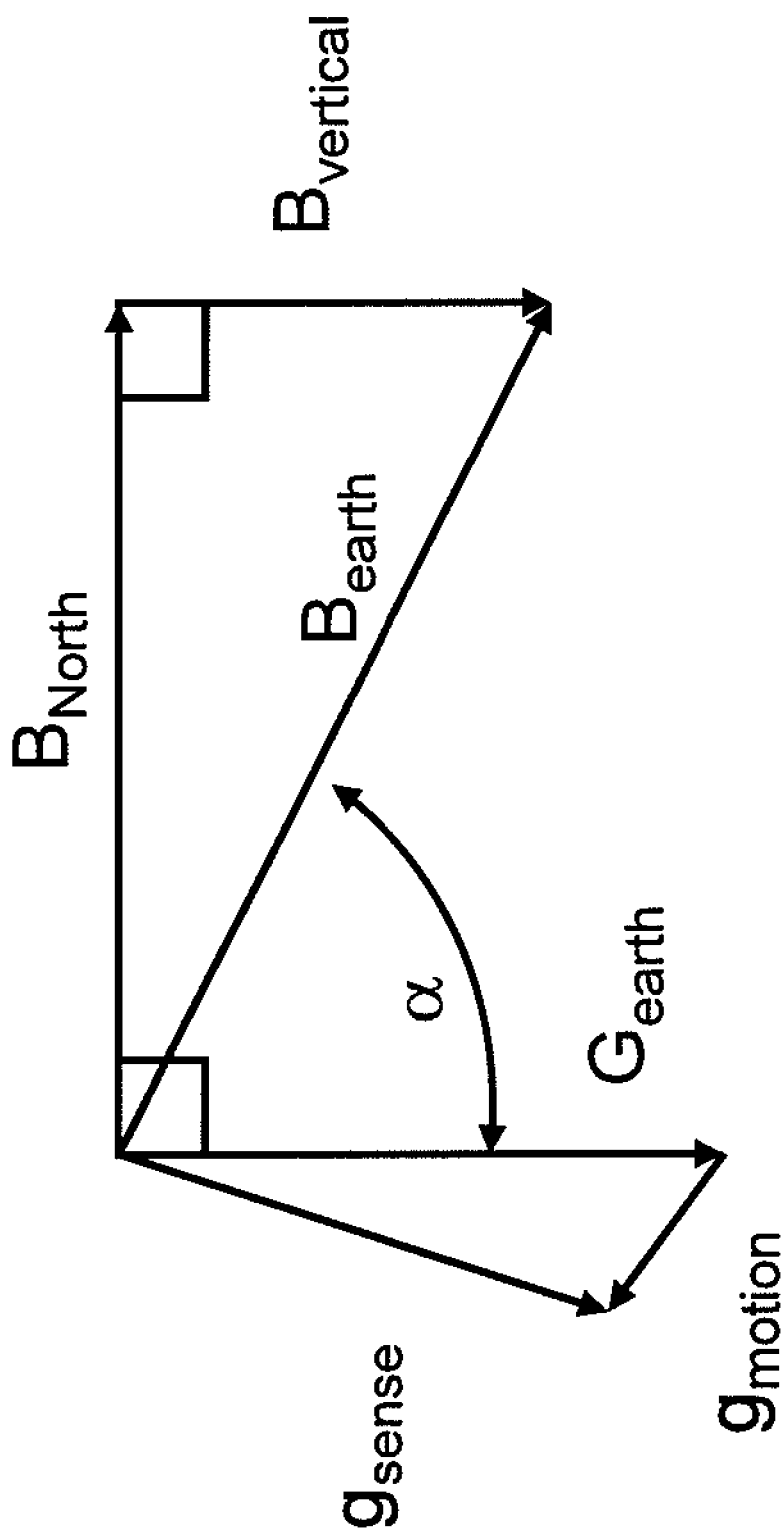
FIG. 3 illustrates the angle between the earth's magnetic field and the earth's gravity vector as utilized in embodiments.

FIG. 3 illustrates the angle between the earth's magnetic field and the earth's gravity vector as utilized. The depiction of FIG. 3 is in a plane containing the earth's gravity vector, $G_{earth}$ and the earth's magnetic vector $B_{earth}$. $g_{motion}$ and $g_{sense}$ may include components into or out of the planar depiction that are not shown. Referring to FIG. 3, the earth's gravity vector $G_{earth}$ is sensed by a level sensor, or preferably a set of accelerometers. When the platform is stationary, the $G_{earth}$ is stable and accurate and defines the platform vertical attitude. In motion, however, the accelerometers will measure $g_{sense}$, which is the vector sum of the earth's gravity and accelerations due to motion, $g_{motion}$. Thus, $g_{sense}$ is problematic for establishing vertical attitude in the presence of motion.

The earth's magnetic vector is shown as $B_{earth}$. The magnetic vector is typically horizontal at the equator and may be nearly vertical near the poles. For most intermediate latitudes Bearth forms some angle $\alpha$ relative to the local gravity vector Gearth. The magnetic vector Bearth may be resolved into a horizontal component Bnorth that forms a vector pointing to magnetic north, and a vertical component, Bvetical, that is typically rejected and ignored. Conventional systems typically go to great length to carefully eliminate the influence of Bvertical by mounting magnetic sensors on a pendulum or by other means. Without correction, Bvertical can cause two degrees of north error for one degree of tilt in the system. The system disclosed herein, however, uses three axis measurements of Bearth, from which Bnorth, Bvertical, and $\alpha$ can be determined.

In motion, the sensing of Bearth is immune to accelerations, and thus, the angle α from Bearth to Gearth can be known accurately. The remaining unknown is a component of gmotion perpendicular to the Gearth-Bearth plane. By using Bearth and α, gsense may be greatly filtered to determine an estimate for Gearth.

With the addition of gyros to the available sensors, attitude rotations can be eliminated and gsense can be further filtered to determine Gearth. Gyros, however, have unknown bias and random drift. Again, Bearth can provide a solid constraint that allows for the estimation and cancellation of gyro bias and random walk.

Figure 4:
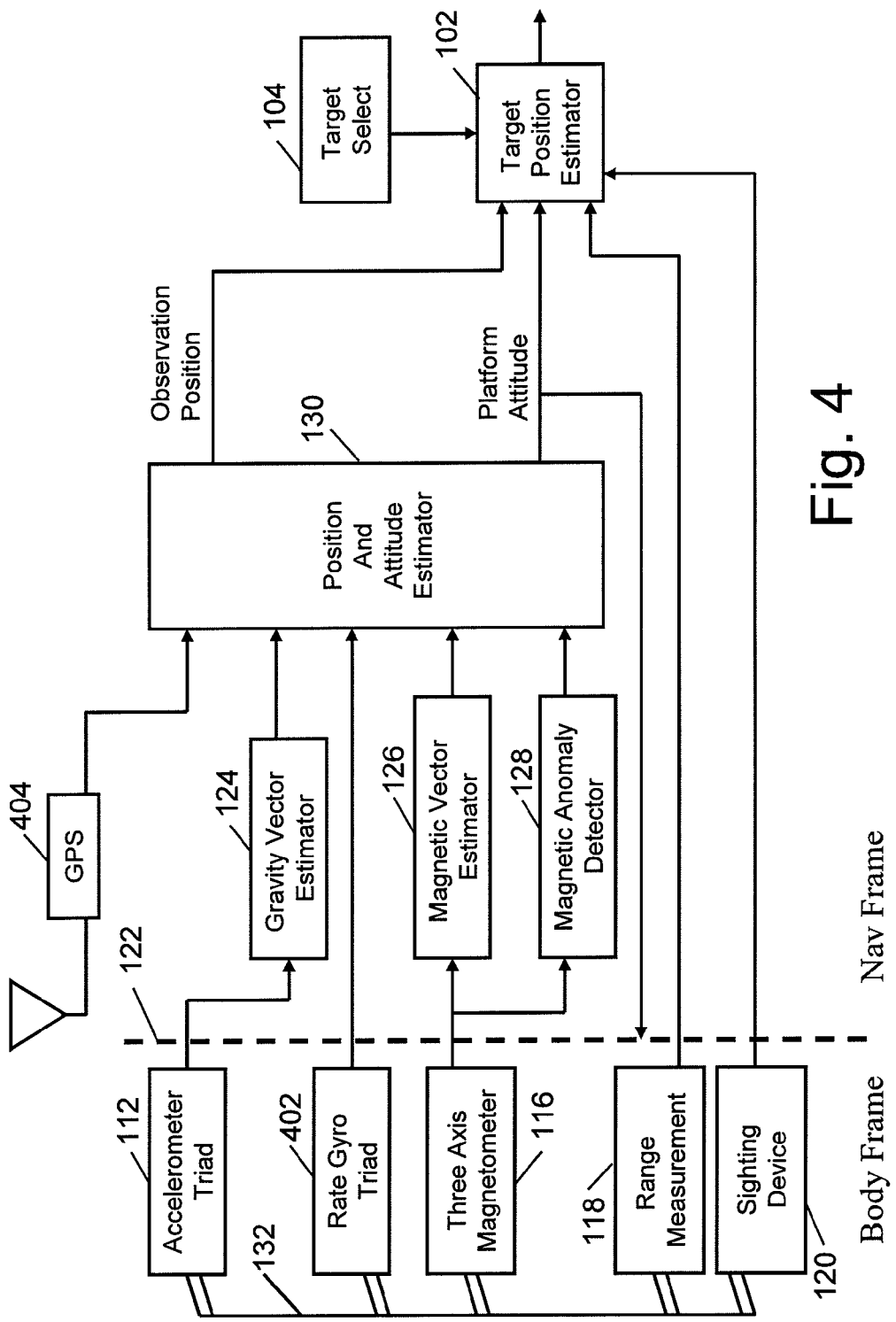
FIG. 4 is a notional block diagram for the exemplary target location system of FIG. 1 with the addition of GPS and gyro information.

FIG. 4 is a notional block diagram for the exemplary target location system of FIG. 1 with the addition of GPS and gyro information. Referring to FIG. 4, the system comprises a group of body frame mounted sensors providing inputs to an azimuth and attitude calculation; a GPS receiver 404 providing platform position; a target sighting device 120 and laser range finder 118 for identifying and measuring distance to the target; and a target position estimator 102 for combining the system measurements to determine a position of the target in the navigation frame coordinate system. The target position may then be communicated to other similar units, or to central command or used locally for fire control.

The target position estimator 102 calculates a target position upon receiving a command to generate a target position, typically from an operator having placed a selected target at a desired location in an optical aiming system and pressing a button 104 to initiate position determination. One useable type of aiming system would be that of a telescopic sight which uses crosshairs which are superimposable on a target image for precise alignment in pointing a device. These sorts of systems typically use crosshairs which are represented as perpendicular intersecting lines. The device is properly pointed when the intersection of the crossing lines appears on the target. Other than cross hairs, other aiming systems might use superimposed dots, circles, or other viewable optical alignment indicators.

The position is then calculated by taking the current navigation position and extrapolating the measured range distance along a bore sight vector determined by measuring platform attitude and any measured configuration offsets as appropriate.

Referring again to FIG. 4, the sensors include an accelerometer triad 112, a rate gyro triad 402, a three axis magnetometer 116, all affixed to a reference platform 132 and providing information on the attitude and motion of the platform. The outputs of the accelerometers 112, gyros 404, and magnetometers 116 yield measurements in body fixed coordinates. The outputs may be compensated and/or filtered in body coordinates and are then transformed 122 to navigation coordinates (alternatively referred to as nav coordinates, or nav frame) for further processing. The navigation coordinate system is preferably the same as or easily related to the typical coordinate system for any maps desired to be used with the system. Navigation frame may use quaternions, direction cosines, Euler angles or other mathematical representations as are known for three dimensional navigation.

The accelerometer output is filtered and compensated and then transformed to nav frame coordinates. Accelerometer data is used to generate a gravity vector estimate 124. If the platform is stationary, the gravity vector is simply the measured accelerometer vector. If the platform is in motion, the gravity vector is estimated as part of the navigation Kalman filter, which filters lateral accelerations to find the vertical gravity vector. Accelerometer data is also compared with GPS velocity information to better estimate velocity and to correct accelerometer errors.

Various components may be included in the target locator. A MEMS IMU is preferred for the target locator due to its miniature size, light weight, low power, and low cost. However, due to inherent bias drifts, g-sensitivity, and noise, data from MEMS inertial sensors typically should be blended (typically through a Kalman filter) with non-inertial data such as GPS satellite signals, gravity, and local magnetic measurements. This blending approach, utilizing an adaptive, self-configurable Kalman filter, is referred to herein as Combined Attitude Aiding (CAA). CAA optimally combines GPS, accelerometer, and magnetometer measurements with gyro data to estimate attitude errors about the roll, pitch, and yaw axes. These corrections are fed back to the onboard navigation and attitude solution in the navigation processor. Using such a wide variety of sensor measurement types makes for a very robust system. Through GPS aiding, a one g specific force on the unit nominally along one axis allows for observability of attitude errors about the other two axes. While the system is in motion, the system's heading is accurately measured from GPS velocity data. Should GPS dropout occur, the calibrated IMU would carry on with position and attitude estimation. Roll and pitch corrections are also made achievable through the use of accelerometer measurements. With magnetic aiding, the target locator navigation frame can be initialized in the field and continually corrected for roll, pitch, and azimuth (conventional magnetic-aided IMU's typically only correct for azimuth). This initialization and continual correction process is accomplished with a brief magnet bias calibration process, estimation of magnetically-derived Euler angles, and continual automatic tracking and filtering of magnetic anomalies in the area. The inventors have found magnetic aiding algorithms to have demonstrated significant attitude drift damping of MEMS gyros even in the presence of distorted magnetic fields. The CAA approach relaxes the requirements of the IMU, allowing for a smaller size, lower cost unit to be used in the system.

Using the CAA approach, a potentially non-observable gyro drift configuration exists when one of the gyro axes is parallel to the earth's magnetic vector, any drift or noise is thus not observable when compared with the earth's magnetic field vector. This is typically overcome by adding gravity information and by motion of the platform away from the parallel axis configuration.

Gyro drift is detected and corrected by comparing integrated gyro attitude with the earth's magnetic vector and gravity vector. The magnetic vector is independent of acceleration and potentially subject to anomalies. The gravity vector is independent of magnetic anomalies, but potentially subject to acceleration due to motion of the platform. The gravity vector defines pitch and roll, but leaves azimuth unknown. The magnetic vector typically has a horizontal component defining magnetic north and a vertical component providing redundant vertical information. In the field, a practical system will transition from stationary to motion, and in motion will move through multiple headings often making a complete circle to return to the starting point. Thus, the system can take advantage of multiple states and take advantage of the error detection and correction for each state. A stationary state can take advantage of accurate vertical information from the accelerometers. Rotational motion can compare gyro and magnetic information to correct gyro scale factor and magnetic biases. Gyro drift that is parallel to the magnetic vector may be detected by re-orienting the platform if normal operator motion is insufficient.

In a conventional magnetic compass system, great care must be given to making sure the system is level, as a slight tilt east or west can typically generate a north error equal or even greater than the tilt, due to the vertical component of the earth's magnetic field. In the present system, this tilt error is corrected without the need for mechanical leveling of the platform. Furthermore, the correction is maintained while in motion in the presence of acceleration.

The rate gyro triad 402 is typically a MEMS gyro triad, which is more generally an angle rate sensor. The triad 402 is ideally three mutually orthogonal sensors providing three dimensional information. The gyro data may be filtered and compensated and then transformed to navigation frame coordinates for use in the estimation of azimuth and attitude.

The three axis magnetometer 116 may be typically three mutually orthogonal single axis magnetometers, or dual and single axis magnetometers. The magnetometers are body frame mounted to the reference platform and sense the earth's magnetic field relative to the platform body attitude. The technology is typically magnetoresistive sensing, but may be flux gate or other technology as is known for sensing the earth's magnetic field.

Magnetic sensor information may be filtered and compensated and then transformed 122 to the navigation frame for further processing. In the navigation frame, the earth's magnetic field vector is estimated 126. Unlike the gravity vector estimate, the magnetic vector is immune to accelerations, lateral or otherwise. The horizontal component of the magnetic vector provides a measurement of magnetic north, which may be compared with other data, e.g., data from a map database, to determine true north. The vertical component of the magnetic vector may be used to enhance attitude estimation. Since the magnetic information is angle information as contrasted with angle rate information from the rate gyros, the magnetic information may be used to bound and estimate gyro bias. Magnetic information is incomplete in the sense that rotations around the magnetic vector are unobservable. Gyro information is incomplete in the sense that integrated bias errors are unbounded. The two sensors are combined to provide complete and stable attitude information.

Magnetic sensors are also subject to anomalies resulting from interaction with non-earth magnetic fields and nearby ferrous materials. A magnetic anomaly detector 128 is provided to detect and correct magnetic errors by combining magnetic and gyro information. One result of combining three axis magnetic and gyro information is that low size-weight-power gyros may be compensated to yield a system that performs like one with a much larger and more expensive gyro. Thus, the system enables mobile, portable, hand carry, and even helmet mount applications not previously feasible.

The system also includes a range measurement device 118, which may be, for example, a laser range finder, radar, or a passive range finding device. A preferred embodiment may use a laser range finder. The laser range finder may be pointed at the target by an operator by using a sighting device 120. The sighting device 120 may be like a gun sight, with or without optical aiding, and/or may include video/computer processing to aid in the detection and/or tracking of targets. The sighting device is co-boresighted with the laser rangefinder, i.e., the sighting device may include a cross hair pattern or other indicia designating the center of axis of the sighting device. This center axis is typically also the center axis of the laser. Thus, the operator points the system to place the cross hairs on the target and then presses a button 104 to activate the laser rangefinder and capture a range for the selected target. Simultaneously, a platform attitude and navigation position are captured associated with the range measurement. Alternatively, a system may identify and track one or more targets off center and thus may also provide offset angles from the center axis for calculating target position. The sighting device 120 and range measurement device 118 are also typically located on the reference platform and provide information at a known angle related to the reference platform. Alternatively, the sighting device 120 may be on a mount with one or more adjustable axes of rotation between the sighting device and the reference platform. These adjustable axes may be measured with encoders, synchros, or other angle measuring sensors.

The various estimators of FIG. 4, including the target position estimator 102 and the attitude and azimuth estimator 130 may be implemented using one or more Kalman type filters in a preferred embodiment, however, other estimators and/or other filters may be used including but not limited to least square estimators, maximum likelihood estimators, Bayesian estimators, as well as simple recursive filters.

Magnetometer aiding introduces absolute azimuth and attitude measurements that limit the growth of angle errors with time due to gyro drift and random walk. One benefit of the system is the ability to select a gyro 112 with higher drift (and associated lower cost and smaller size) when used in combination with magnetometer aiding. This can be seen in FIG. 5.

Figure 5:
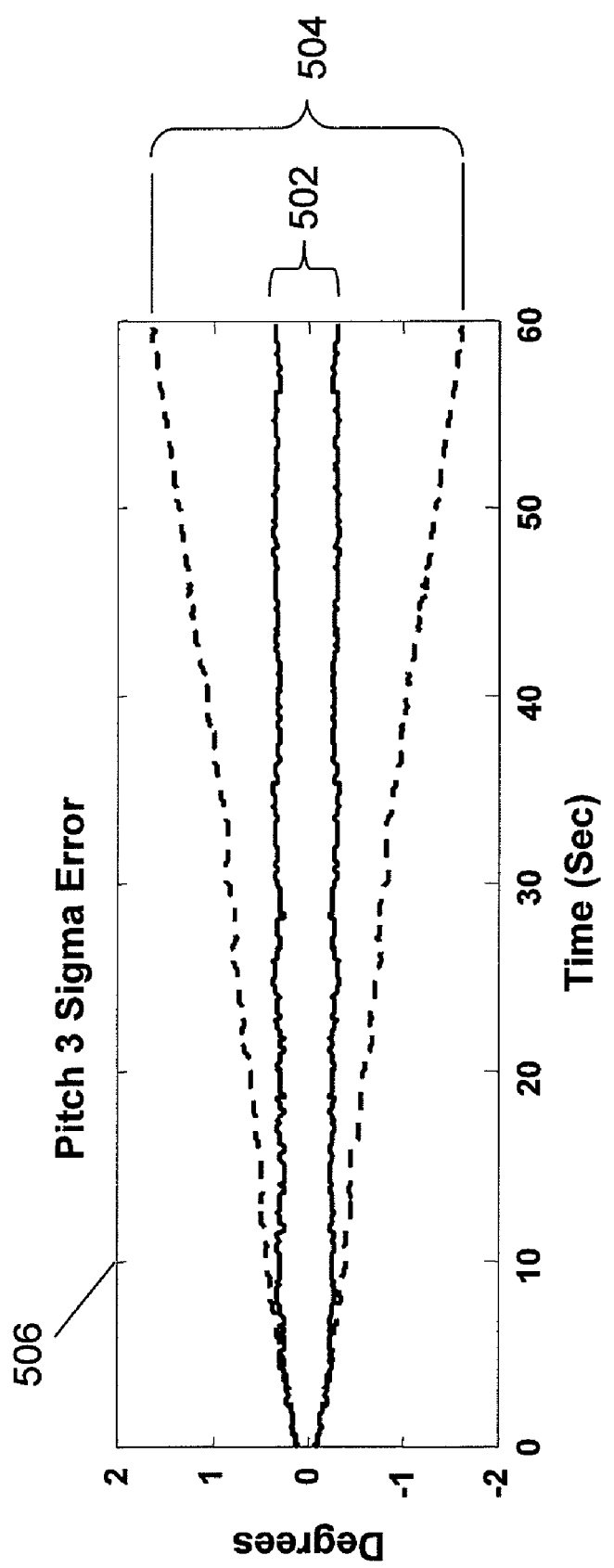
FIG. 5 is a plot of the results of two Monte Carlo simulations showing 3 sigma error growth of pitch attitude as a function of time comparing an exemplary system with magnetometer aiding to an exemplary system without magnetometer aiding.

FIG. 5 is a plot of the results of two Monte Carlo simulations showing 3 sigma error growth of pitch attitude as a function of time comparing an exemplary system with magnetometer aiding to an exemplary system without magnetometer aiding. Note that for the system without magnetometer aiding, the error 504 continues to grow without bound; whereas, for the system with magnetic aiding, the error 502 reaches a maximum bound at just under ten seconds 506 and remains constant thereafter.

Figure 6:
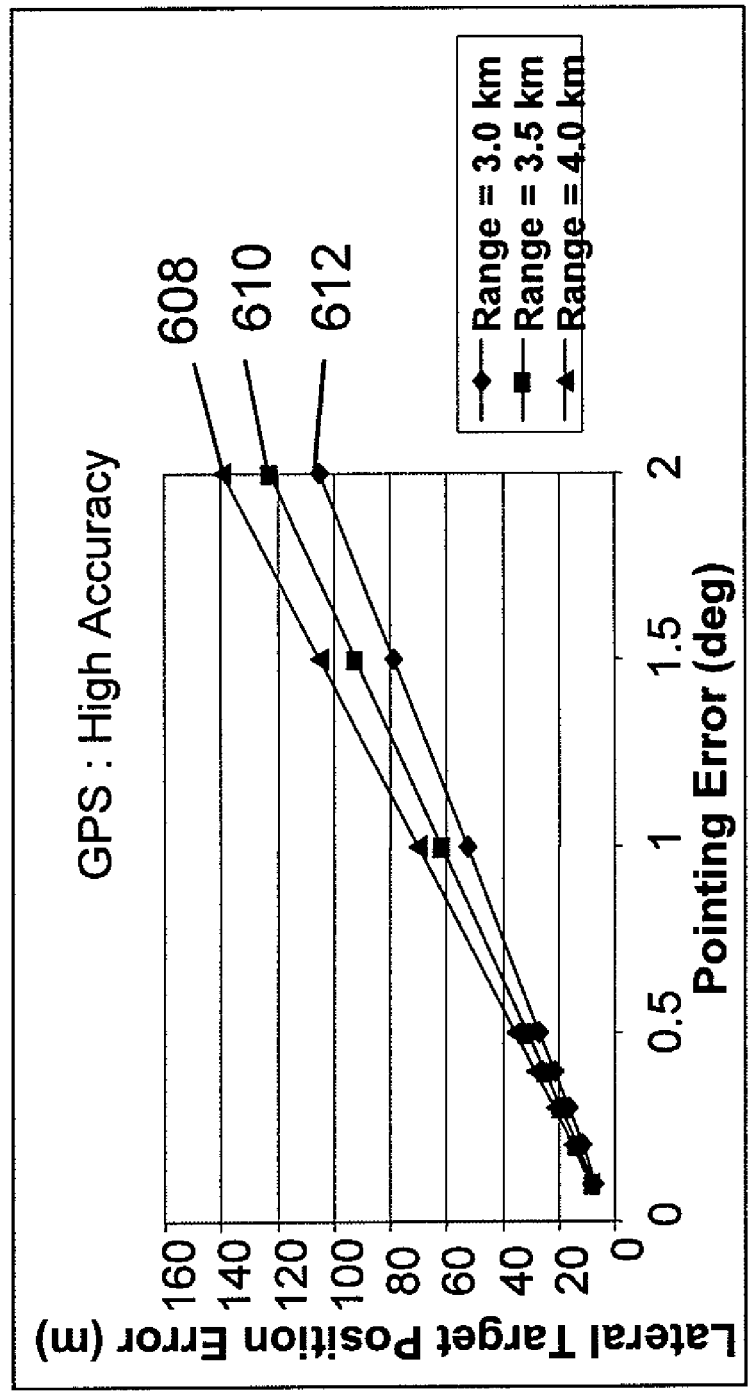
FIG. 6 shows the total lateral pointing error for three different exemplary ranges 3.0 km 406, 3.5 km 404, and 4.0 km 402 for the high performance GPS observer position shown in FIG. 2A.

FIG. 6 shows the total lateral pointing error for three different exemplary ranges 3.0 km 612, 3.5 km 610, and 4.0 km 608 for the high performance GPS observer position shown in FIG. 2A. Note that a 50 meter total error requires a pointing error on the order of 0.6 degrees for a 4 km target. A 0.6 degree error requires very accurate north finding with careful attention to local magnetic variation and disturbances.

Figure 7:
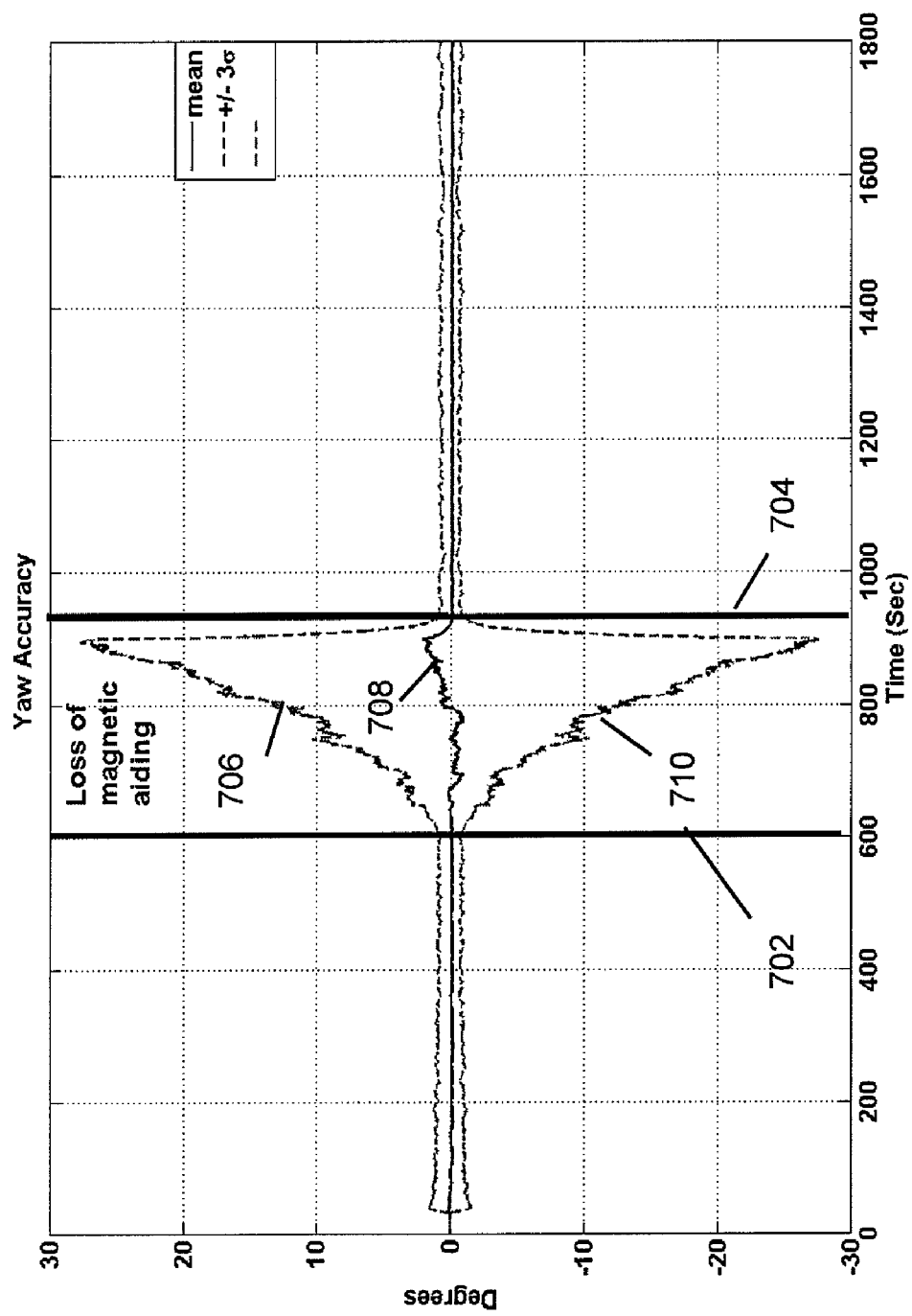
FIG. 7 is a graph of the results of a Monte Carlo simulation showing the effect of losing magnetic information.

FIG. 7 is a graph of the results of a Monte Carlo simulation showing the effect of losing magnetic information. The simulation shows heading attitude as a function of time. The system is turned on at zero and initializes for the first 30 seconds, after which heading improves slightly with time until 600 seconds. At 600 seconds 702 magnetic aiding is turned off as when a magnetic anomaly is detected. Graph 708 shows the average error growth and graphs 710 and 706 show the maximum error growth during the interval. At 900 seconds, magnetic aiding is turned back on and the system rapidly captures the correct heading at 930 seconds 704, whereupon heading is maintained at a high accuracy.

Figure 8:
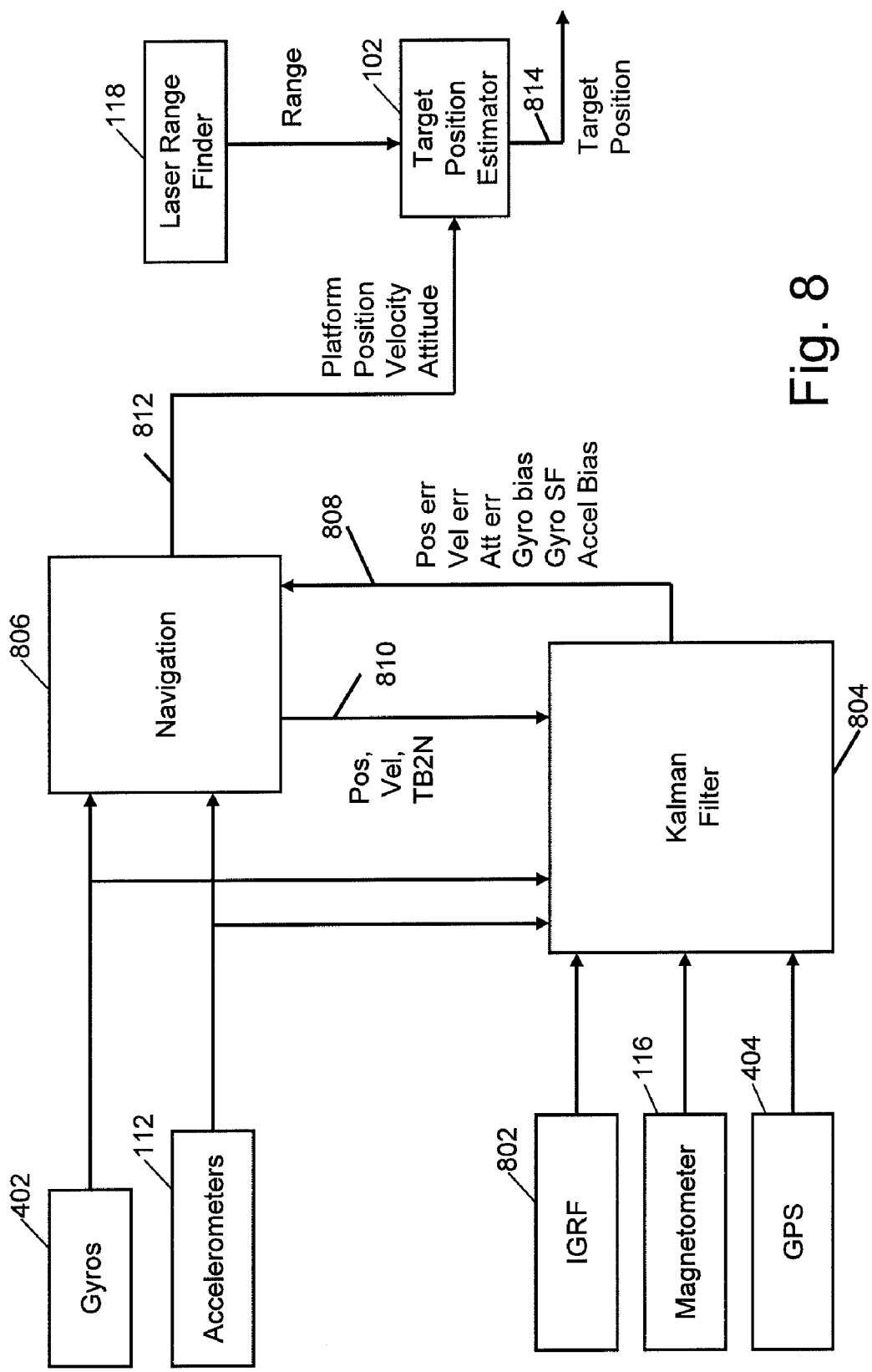
FIG. 8 is a simplified system block diagram showing an exemplary target location system.
Figure 9:
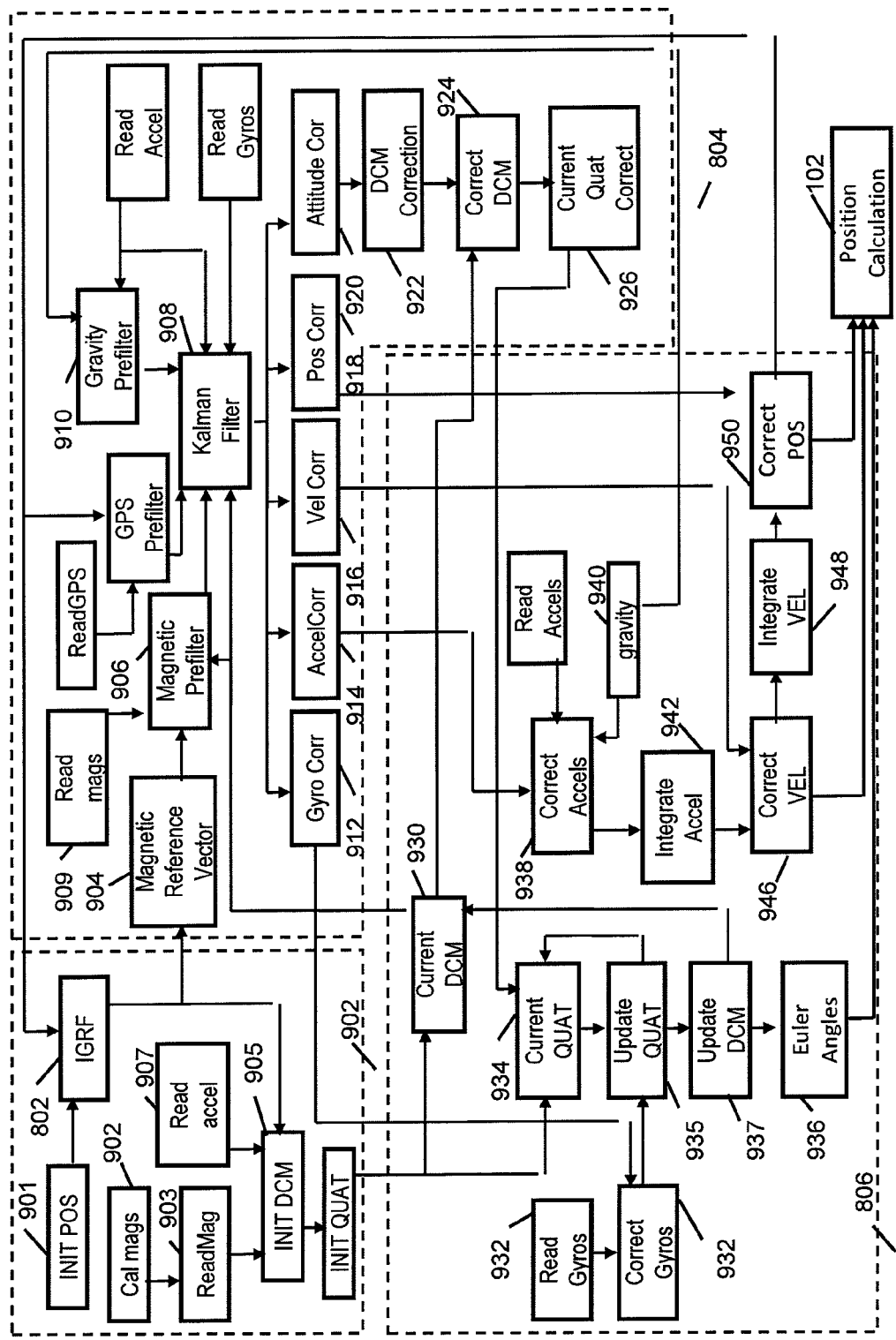
FIG. 9 is a system block diagram of the system of FIG. 8 showing greater detail.

FIG. 8 is a simplified system block diagram showing an exemplary target location system. In one embodiment, the target location system may be configured with a Kalman filter that estimates the system position and attitude states directly. Alternatively as shown in FIGS. 8 and 9, and in accordance with a preferred embodiment, the inertial sensor integration 806 and body to navigation frame transformations are computed outside of the Kalman filter. The Kalman filter 804 is used to estimate errors in the basic system processes.

Referring to FIG. 8, the inertial sensors comprising accelerometers 112, and gyros 402 are transformed to the navigation frame where they are integrated 806 to provide platform position, velocity, and attitude 812 to the target position calculation 102. The target position calculation 102 combines current position and attitude 812 with a target range measurement 118 to yield a target position measurement 814 (alternatively referred to as a target position estimate). The system sensors 112, 402 are also provided to the Kalman filter 804 along with GPS information 404 and navigation results 810 (position, velocity, and body to nav transform) so that the Kalman filter 804 may estimate measurement errors 808 and provide corrections to the navigation calculation. The system may be initialized using magnetic vector measurements 116, earth's magnetic field model information 802, and gravity vector information 402, along with GPS position information 404.

FIG. 9 is a system block diagram of the system of FIG. 8 showing greater detail. Referring to FIG. 9, the system is organized into an initialization section 902, navigation section 806, Kalman filter section 804, and position calculation 102 as shown within the several dotted line regions. The initialization process 902 begins by establishing an initial observer (platform) position from an initial position source 901 (see FIG. 1, 111 or FIG. 4, 404). The initial position may be derived from an initial GPS position 404, a memory of the last known position, or an operator input of the current position. The initial position 901 is used to retrieve the initial navigation frame magnetic reference vector from an earth magnetic field model (IGRF) 802 according to current latitude and longitude. Initial magnetic calibration 902 may also include parameters read from memory. Additional magnetic calibration may be achieved by exercising the system through calibration maneuvers 902. The initial gravity vector may be established by reading the accelerometers 907 with the system in a stationary state. The initial body to nav direction cosine matrix transform (also referred to as DCM) 905 may then be established based on the three axis accelerometer data 907 measuring the earth's gravity vector combined with the three axis magnetic vector 903 measured by the three axis magnetic sensor. In addition, the three axis magnetic vector measured in body coordinates is converted to nav coordinates 903 and compared with the earth magnetic model in nav coordinates, providing redundant vertical information. The initial DCM 905 is then used to establish the initial quaternion nav states.

The magnetic prefilter 906 combines the initial magnetic reference vector 904 in nav coordinates with current magnetic body referenced readings 909 transformed according to the current DCM 930. The magnetic prefilter 906 includes magnetic sensor compensation and may include magnetic anomaly detection. The output of the magnetic prefilter 906 includes magnetic vector information and associated variance information for the Kalman filter. The GPS prefilter compares GPS position measurements with current accelerometer position to yield position error for the Kalman filter 908.

Accelerometers and gyros are read directly and fed to the Kalman filter 908 for estimation of accelerometer and gyro errors, which may include one or more of bias, g sensitivity, misalignment, or other errors.

The Kalman filter estimates corrections for the gyro 912, accelerometer 914, velocity 916, position 918, attitude 920, and DCM 922. DCM corrections are converted to quaternion corrections 926.

Position and attitude are updated using corrected gyro 932 and accelerometer 938 readings. Accelerometer readings are corrected 938 for estimated errors 914 and for gravity 940 to yield accelerations that are integrated 942 to obtain velocity 946 and again integrated 948 to obtain platform position 950. Attitude quaternion 934 are updated 935 based on corrected gyro 932 readings, and are used to update 937 the DCM. The DCM is converted to Euler angles 936, if required for target position calculations. Alternatively, the DCM may be used directly. Target position 102 is then calculated by extrapolating from observer platform position 950, to target position using the target range measurement platform attitude 936 and any target offset or gimbal angle if included in the system.

Kalman Filter

One skilled in the art would recognize the following Kalman filter format:

State Propagation:

$$\hat{x}_{k+1} = \Phi_k \hat{x}_k$$

$$P_{k+1} = \Phi_k P_k \Phi_k^T + Q$$

Update:

$$K_k = P_k H^T (H P_k H^T + R_v)^{-1}$$

$$Z_k = \text{measurement} - \text{estimate} = z_k - H \hat{x}_k$$

$$\hat{x}_k = \hat{x}_k + K_k Z_k$$

$$P_k = (I - K_k H) P_k (I - K_k H)^T + KRK^T$$

where,
$\Phi$ is the state transition matrix,
Q is the process noise covariance matrix,
K is the Kalman gain matrix,
P is the error covariance matrix,
H is the observation matrix,
R is the measurement noise covariance matrix,
$\hat{x}$ is the state estimate matrix,
$Z_k$ is the residual matrix, also referred to as innovations,
I is the identity matrix,
k is the time step index.

The system may be configured as a Kalman filter that estimates the system position and attitude states directly. Alternatively as shown in FIGS. 8 and 9, and in accordance with a preferred embodiment, the system is organized with the inertial sensor integration and body to navigation frame transformations outside of the Kalman filter, structuring the Kalman filter to estimate errors in the basic system processes. Thus, an exemplary Kalman filter may be structured to include the 37 error states listed in Table 2.

TABLE 2

Kalman Filter States

| Symbol | Characteristic | Number Of States | State Number |
|---|---|---|---|
| P | Position Error | 3 | 1-3 |
| V | Velocity Error | 3 | 4-6 |
| A | Attitude Error | 3 | 7-9 |
| $G_b$ | Gyro Bias | 3 | 10-12 |
| $G_{sf}$ | Gyro Scale Factor | 3 | 13-15 |
| $G_{gsen}$ | Gyro G-Sensitivity Bias | 3 | 16-19 |
| $G_{mis}$ | Gyro Misalignment | 6 | 20-24 |
| $A_b$ | Accelerometer Bias | 3 | 25-27 |
| $A_{sf}$ | Accelerometer Scale Factor | 3 | 28-30 |
| $A_{mis}$ | Accelerometer Misalignment | 6 | 31-36 |
| $G_{ps}$ | GPS Clock Bias | 1 | 37 |

Each of the errors listed in Table 2 are optional. Each may be included according to the accuracy of the components and the system accuracy objectives. Additional errors may be included in accordance with an error model for the respective components. Accordingly, exemplary $\Phi$, Q, H, and R matrices are shown in FIGS. 10-15.

FIG. 10A and FIG. 10B illustrates an exemplary F matrix, related to the $\Phi$ matrix, alternatively referred to as the state transition matrix. The F matrix is the continuous state transition matrix and the $\Phi$ matrix is the discrete state transition matrix related according to the following relationship:

$$\Phi = I(37 \times 37) + F^* \Delta T$$

$\Phi$=discrete state transition matix
I=37 by 37 indentity Matrix
F=continuous state transition matrix
$\Delta T$=time step Referring to FIG. 10A, FIG. 10A shows sub matrices of the F matrix with the rows and columns relating to the states of Table 2. The F matrix represents couplings among the states. Sub matrix 1002 represents the coupling between position error and velocity error.

Rows 4-6 relate to the accelerometer 112. The values $a_b^x$, $a_b^y$, $a_b^z$ are the uncompensated body referenced accelerometer signals. Sub matrix 1004 is the coupling between velocity and attitude error. Sub matrix 1006 is the coupling between velocity error and accelerometer bias. $T_b^N$ is the transform matrix from body to navigation frame. Sub matrix 1008 relates velocity error and accelerometer scale factor. Sub matrix 1010 relates velocity error to accelerometer misalignment.

Referring to FIG. 10B, FIG. 10B relates attitude error, rows 7-9 and states 7-9 to the other states. The $\omega_b^x, \omega_b^y, \omega_b^z$ values are the uncompensated signal outputs from the gyros 402. Sub matrix 1012 relates each attitude error to the other attitude errors. Sub matrix 1014 relates attitude error to gyro bias. Sub matrix 1016 relates attitude error to gyro scale factor. Sub matrix 1018 relates attitude error to gyro g-sensitivity. Sub matrix 1020 relates attitude error to gyro misalignment. Matrix elements not in FIG. 10A or FIG. 10B are typically zero.

Figure 11:
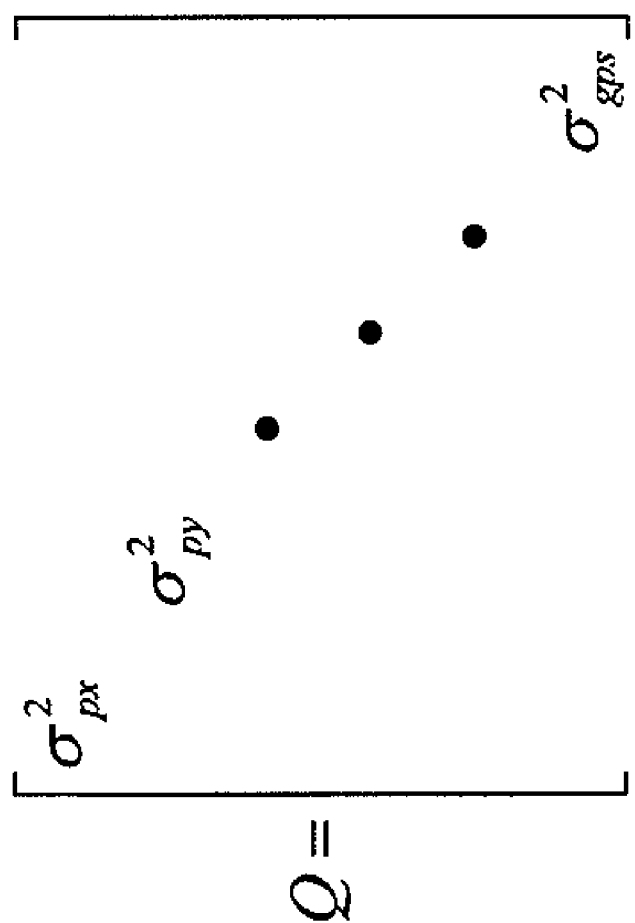
FIG. 11 illustrates an exemplary Q matrix, alternatively referred to as the process noise matrix.

FIG. 11 illustrates an exemplary Q matrix, alternatively referred to as the process noise matrix. In one embodiment the Q matrix is a diagonal matrix for the process noise values corresponding to each state given in Table 2. Thus, $Q_{1,1}$ is $\sigma px^2$, and $Q_{2,2}$ is $\sigma_{py}^2$ and so on to $Q_{37,37}$, where $\sigma_{px}^2$ is the x position error uncertainty and $\sigma_{px}^2$ is the y axis position error uncertainty, with each corresponding state uncertainty on the diagonal and zero off diagonal.

FIG. 12 illustrates an exemplary H matrix, alternatively referred to as a measurement observation matrix. Referring to FIG. 12. columns 1-3, rows 1-11 include GPS pseudorange vectors for up to eleven satellites. The pseudorange vectors 1202 are provided by the GPS receiver. Column 37 includes the speed of light 1206 for GPS pseudorange measurements. Inclusion of GPS pseudorange measurements allows the Kalman estimator to combine GPS and inertial sensors to estimate GPS errors in view of the inertial sensor measurements as well as estimating inertial errors in view of the GPS measurements. Rows 12-14 relate to magnetic measurements and indicate direct measurement of each magnetometer as body to nav and observabiliy are computed external to the Kalman filter. Rows 12-14 relate to the magnetic attitude errors resulting from the cross product of a magnetic measurement with the reference magnetic vector, as discussed in detail with reference to FIG. 16. Rows 15-17 relate to accelerometer measurements of gravity. The nominal gravitational constant of 9.81 m/sec$^2$ is shown, but may be adjusted for latitude for greater accuracy.

Columns 1-3 (1202) relate to position error, Columns 7-9 (1204) relate to attitude error. Column 37 (1206) relates to GPS clock bias.

Figure 26:
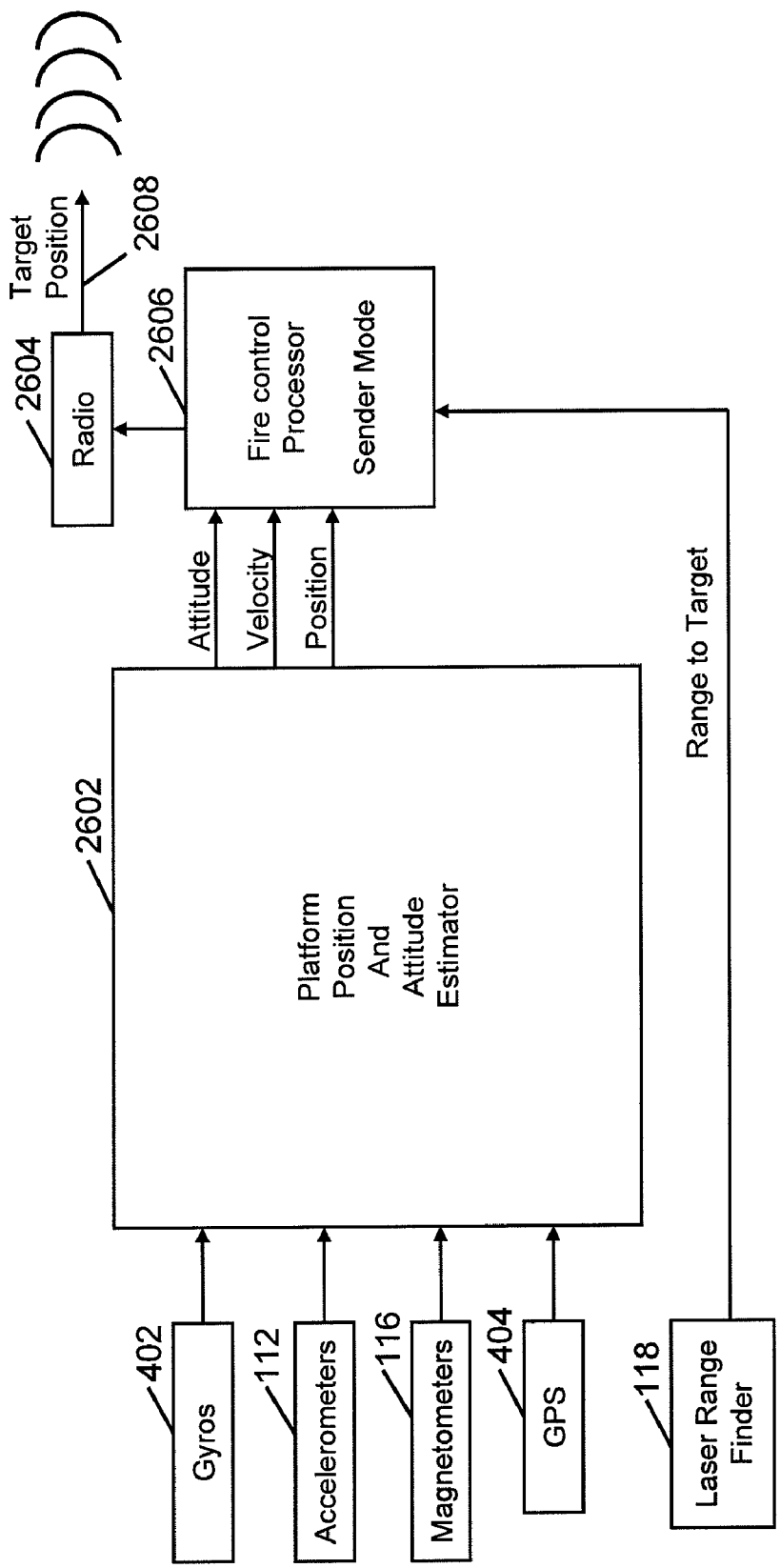
FIG. 26 is an exemplary weapon system in sender mode including an integrated target location system.
Figure 27:
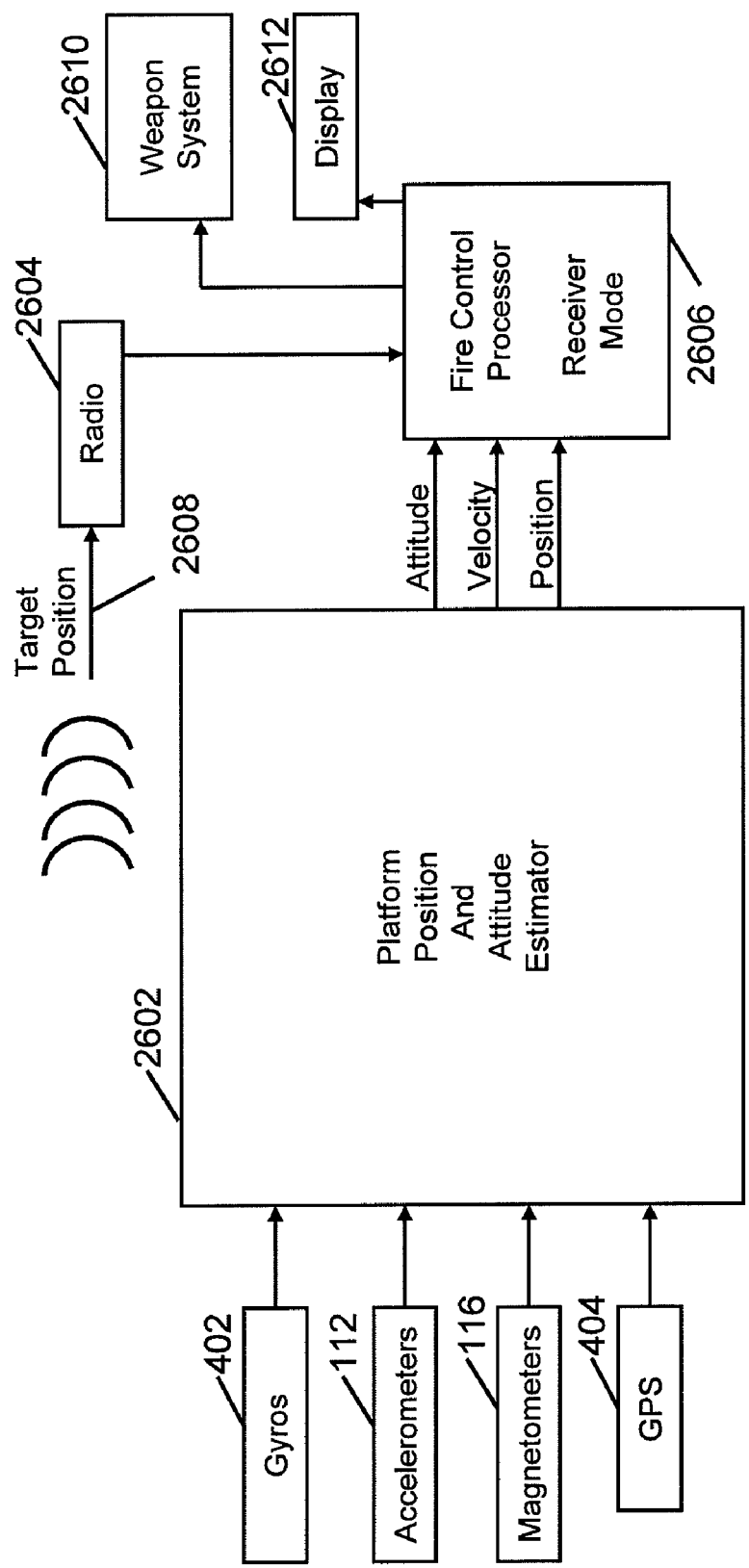
FIG. 27 illustrates a second unit operating in receiver mode.

FIG. 13 illustrates a typical numerical example of the H matrix of FIG. 12. Referring to FIG. 26, column numbers are shown as the bottom row, below the matrix. Columns 4-6 and 10-36 are zero and are shown as a single column for simplicity. The exemplary numbers shown are taken from a simulation.

Figure 14:
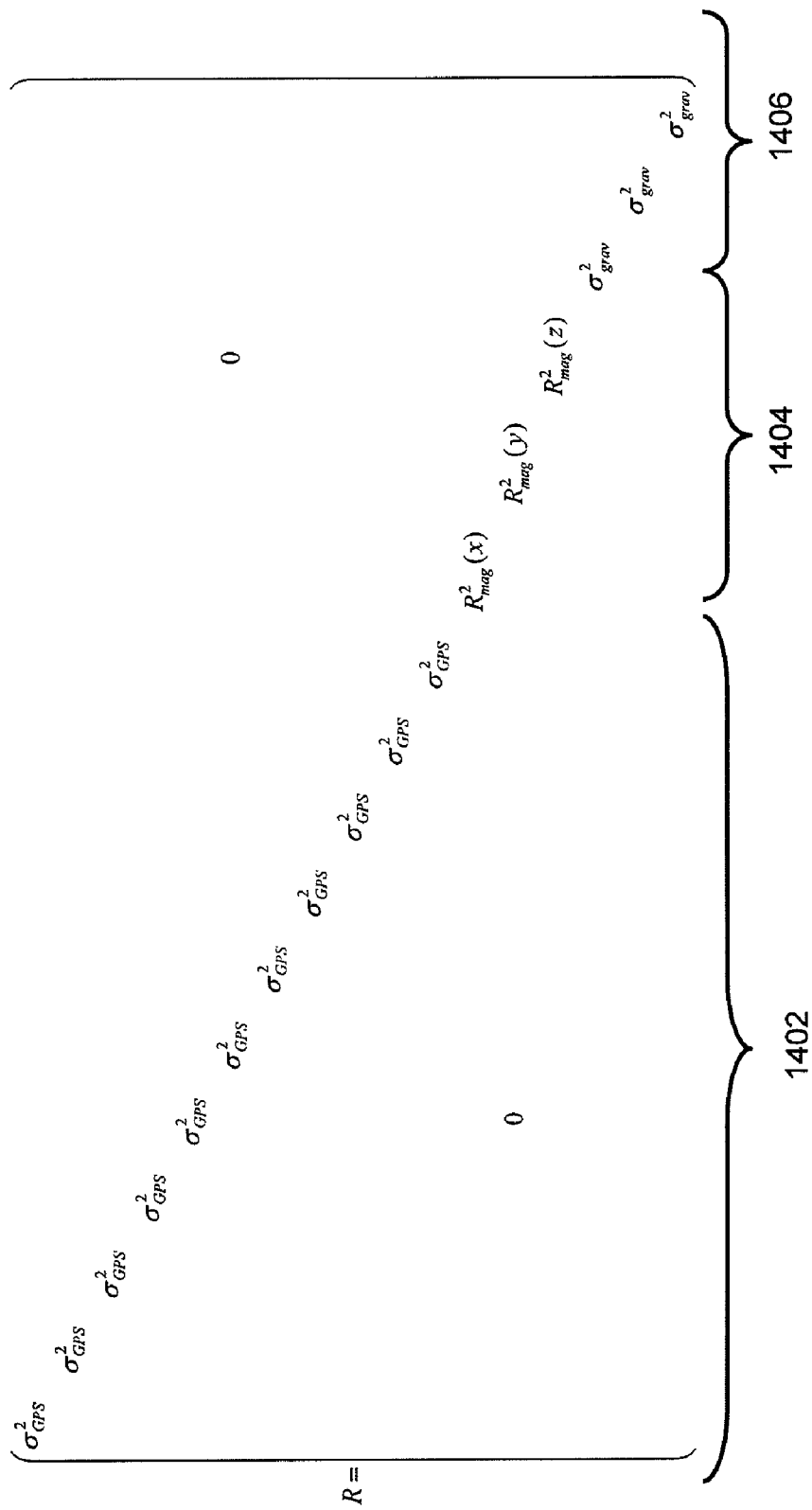
FIG. 14 illustrates an exemplary R matrix, alternatively referred to as a measurement noise covariance matrix.

FIG. 14 illustrates an exemplary R matrix, alternatively referred to as a measurement noise covariance matrix. Referring to FIG. 14, the R matrix is a diagonal matrix with 11 columns 1402 (and rows) for GPS noise, three columns 1404 (and rows) for magnetic uncertainty modified by observability as further discussed with reference to FIG. 16, and three columns 1406 (and rows) for accelerometer noise and uncertainty. The R matrix for a basic Kalman filter is typically static; however, the present Kalman filter varies the magnetic uncertainty cells in accordance with observability determinations and in accordance with operational state as detected by the magnetic anomaly detection process.

FIG. 15 illustrates a typical numerical example for the R matrix of FIG. 14. Referring to FIG. 15, the GPS noise is shown as the same for each satellite. Alternatively, GPS R matrix values may vary if information is available. The accelerometer values are all equal as the three accelerometers are of the same design. Alternatively, if more information is available, the values may be individually set. Note in particular the magnetic values. The magnetic values are the result of the observability calculations described with respect to FIG. 16, and may also result from detection of magnetic anomalies, which may significantly increase the magnetic R values upon detection of a magnetic anomaly.

Figure 16:
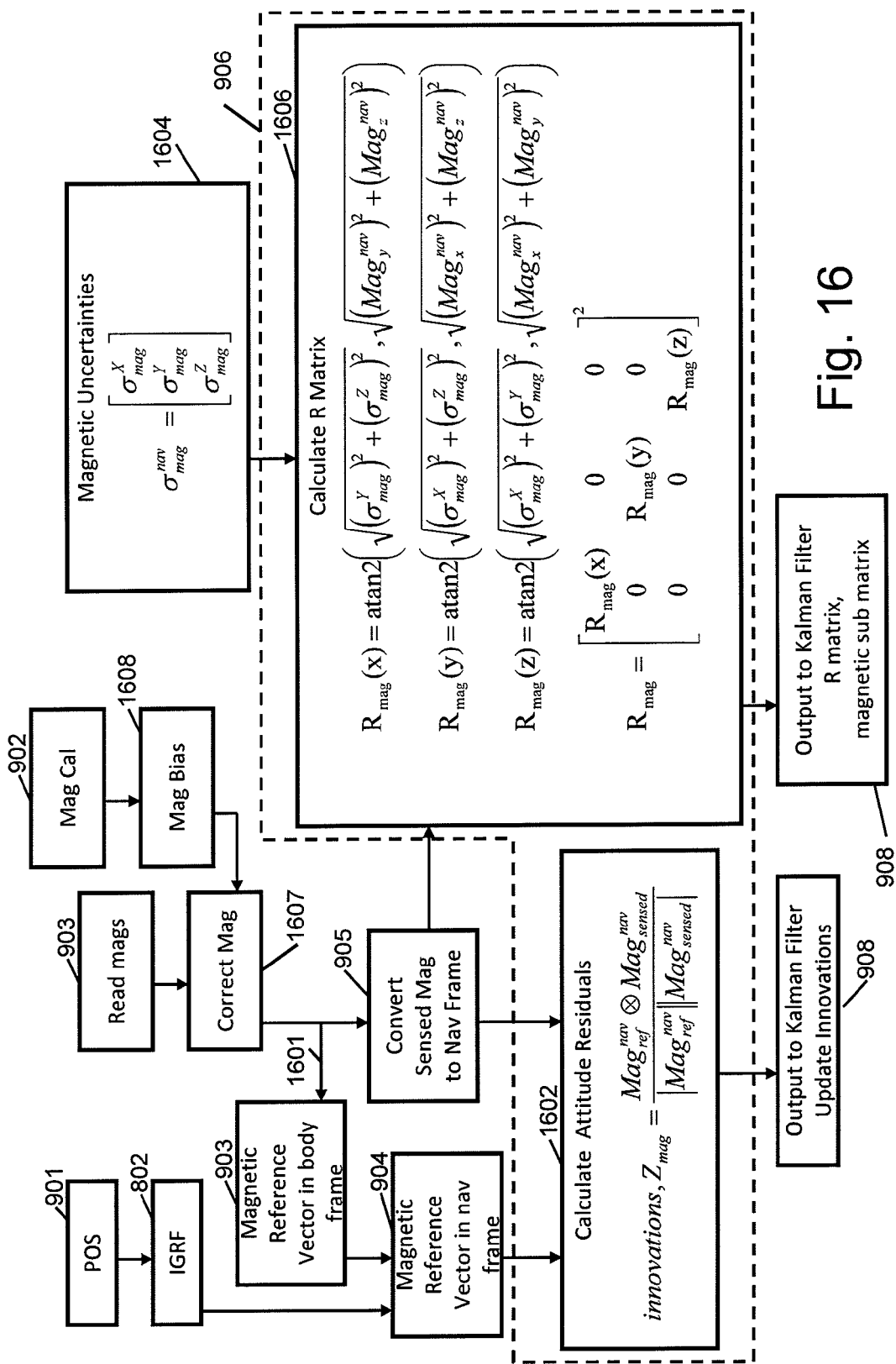
FIG. 16 illustrates an exemplary magnetic prefilter process.

FIG. 16 illustrates an exemplary magnetic prefilter 906 process in accordance with the disclosed embodiments. Referring to FIG. 16, the magnetic prefilter 906 comprises two calculations, a calculation of magnetic residuals 1602 and a calculation of magnetic variances 1606 for use in the Kalman filter. In addition, the magnetic prefilter may include magnetic anomaly detection as discussed elsewhere in this disclosure. The magnetic residuals 1602, alternatively referred to as innovations 1602, are calculated by comparing a magnetic reference vector 904 with a current magnetic vector measurement 905. The exemplary magnetic prefilter 906 calculates magnetic residuals 1602 based on an angle difference between a magnetic reference vector $\mathrm{Mag}_{ref}^{nav}$ (904) and a current magnetic vector measurement $\mathrm{Mag}_{sensed}^{nav}$ (905). The prefilter 906 also calculates magnetic variances 1606 for use in the Kalman R matrix (FIG. 14). The magnetic reference vector $\mathrm{Mag}_{ref}^{nav}$ is the best estimate of the earth's magnetic vector at the present location in the absence of magnetic anomaly. The magnetic reference vector $\mathrm{Mag}_{ref}^{nav}$ is initially estimated by using initial position information to extract nominal magnetic vector information from a magnetic model of the earth's magnetic field, such as the three dimensional IGRF database. Alternatively, a startup measurement 1601 may be used to generate the reference vector $\mathrm{Mag}_{ref}^{nav}$. The startup measurement 1601 may be made in response to a command from an operator or with operator assistance in the confirmation that no magnetic disturbances are visible in the area. In addition, the database value and the measurement may be compared to detect certain anomalies even upon startup.

Referring again to FIG. 16, sensed magnetic measurements include any corrections 1607 known to the system. The corrections 1607 may include, but are not limited to bias 1608, scale factor, and misalignment. The initial corrections may include stored corrections from past operation or from manufacture calibration. The corrections 1607 may later include corrections from the Kalman estimation process. Magnetic corrections may also include corrections from a calibration process 902, which uses the inertial sensors and 360 degree defined maneuvers to determine offsets, scale factors and misalignments. Sensed measurements 903 are converted from body to navigation frame 905 according to the currently best estimate for platform attitude.

Residuals may be determined by comparing the magnetic reference vector and the sensed magnetic vector. In one embodiment, the magnetic residuals are determined by taking a normalized vector cross product 1602 between the magnetic reference vector and the sensed magnetic vector measurement. This results in a vector orthogonal to the plane of the two magnetic vectors and having a magnitude equal to the sine of the angle between the two magnetic vectors. The resulting vector 1602 relates to the system attitude error and may be used to update the Kalman filter. In one embodiment, the resulting vector 1602 is substituted for the residuals computed in the Kalman process, i.e., Z=z−Hx may be computed and the magnetic values from 1602 substituted for the magnetic values in Z. Updates are also subject to the Kalman gain matrix, which is dependent on the R matrix, which also has computed values for the magnetic variables.

The magnetic R matrix values are determined by comparing magnetic sensor uncertainty 1604 to magnetic sensor readings 905 in accordance with the observability of each axis. The observability relates to the degree to which the axis being observed is non-parallel to the earth's magnetic vector, as rotations about the magnetic vector are unobservable through magnetic vector measurements. (The reference magnetic vector or a measured vector may be nearly equal and either may be used to determine observability). The magnetic sensor uncertainty may include random noise and uncompensated error. The R matrix values represent uncertainty in the measurement and have an inverse relationship to the authority of the measurement in the update. Thus, non-observable (parallel) angles result in very high R values with minimum authority and perpendicular angles result in full authority, i.e., the measurement is included at a gain based on the remaining errors in the measurement (e.g. magnetic measurement uncertainties and noise). Thus, magnetic measurements are added to Kalman updates in proportion to the observability, and inversely with respect to the R matrix (uncertainty) value.

A number of exemplary functions may be used to provide the relationship. In one embodiment, the angle between the body axis and the reference magnetic vector may be determined, and a function may be applied to derive a corresponding R matrix value. The function may be linear, non-linear, quadratic, logarithmic, table lookup, or other function. Numerous factors may influence the choice of a function for a particular application, including but not limited to, computational complexity, sensor characteristics, particular scenario characteristics, and other factors.

In one embodiment, as shown in FIG. 16 1606, generally, for a given axis, the sensor noise for the two orthogonal axes to the given axis is compared with a magnetic signal value for the two orthogonal axes. In one embodiment, the noise variance 1604 for the two orthogonal axes is divided by a signal value 905 for the two orthogonal axes. In one particular variant, an arctangent of the noise variance sum for the two orthogonal axes divided by the signal value sum of the two orthogonal axes. The arctangent function may be used to limit a singularity when the signal value is near zero. Other functions may also be used to limit the potential singularity. The noise and signal values may be the respective signals or signals squared or square root of the sum of the signals squared. In the embodiment shown in FIG. 16, the noise value is the square root of the sum of the squares of the rms noise and uncertainty for two orthogonal axes. The signal value is the square root of the sum of the squares of the magnetic signal measurements for the two orthogonal axes. The arctangent function, a tan 2(a,b), is a two parameter, four quadrant arctangent function that avoids divide by zero issues when the magnetic sensor measurements are near or equal to zero. Alternative methods of avoiding divide by zero may be used. The results of the arctangent are then squared and the squared value stored in the corresponding R matrix location for the Kalman update cycle.

Additional relations, including lookup tables and other functions may be used to relate observed noise to Kalman R matrix variances.

Figure 17:
FIG. 17 depicts an exemplary Z matrix.

FIG. 17 depicts an exemplary Z matrix in accordance with the disclosed embodiments. The Z matrix 1700 is referred to as innovations or alternately as measurement residuals. The Z matrix is typically calculated as Z=z−Hx, where z is a new measurement and Hx is a current estimate of the expected measurement based on current states. Referring to FIG. 17, the elements of the Z matrix are computed as normal except for the cells associated with the magnetic measurements. In the magnetic measurement cells, the results of the cross product computed as discussed in FIG. 16 are substituted for the normal z-Hx result. The z-Hx result for the magnetic rows is discarded.

Figure 18:
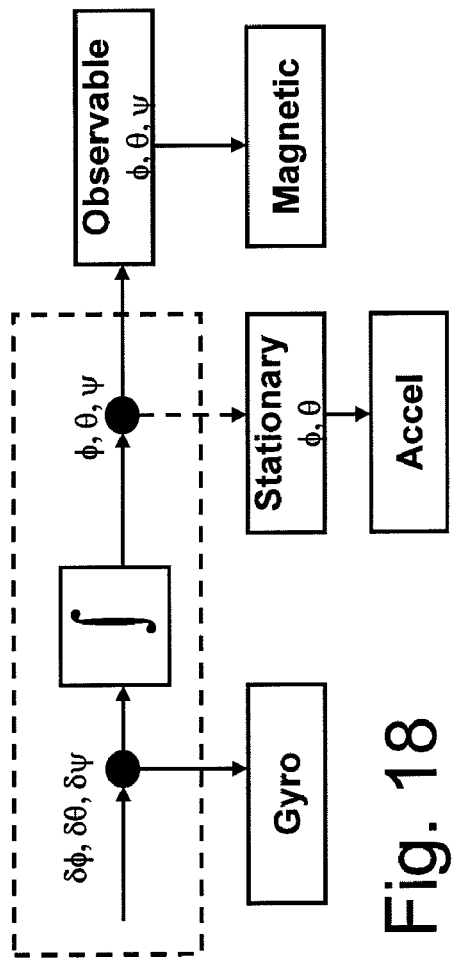
FIG. 18 is a system model diagram for an exemplary target position system.

FIG. 18 is a system model diagram for an exemplary target position system. Referring to FIG. 18, the states shown within the dotted lines are hidden system states for which various measurements are available as shown outside the dotted lines. Rotational states comprise three rotational velocity states, $\delta\phi, \delta\theta, \delta\Psi$. and three rotational angle states, $\phi,\theta,\Psi$ representing pitch, roll, and azimuth, respectively. Various conventions exist for definition of these quantities, any consistently applied convention may be used. Azimuth as used herein is a measure of rotation around an axis parallel to the earth's gravity vector that measures the rotation angle from north, which may be magnetic north or true north, depending on context.

Three redundant measurements of rotational states are available from the gyro, accelerometers, and magnetic sensors. Rotational rate for three axes may be measured with the gyro subject to gyro errors and noise. Vertical attitude based on measuring the earth's gravity vector may be best measured by the accelerometers when the system is stationary to avoid errors due to lateral motion accelerations. A magnetic vector may be measured to provide both azimuth and vertical information that is subject to the observability of each axis.

The magnetic and accelerometer information comprise two non parallel vectors that each constrain two axes and together constrain three axes. The gyro information constrains three axes but is subject to drift due to integrating the gyro bias. The accelerometer and magnetic information is not subject to drift, but may be subject to disturbances from lateral accelerations or magnetic anomalies that the gyro tolerates. Thus, by proper combination of the redundant sources, errors in each may be overcome by the other sources.

Figure 19:
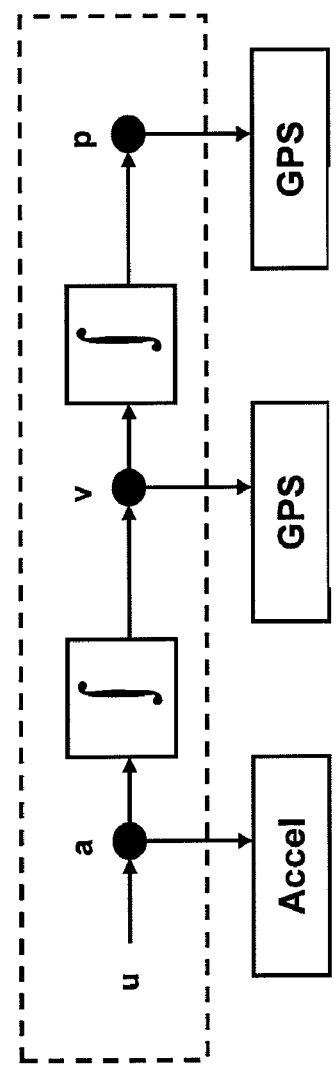
FIG. 19 shows hidden system states related to position estimation.

FIG. 19 shows hidden system states related to position estimation. Referring to FIG. 19, platform acceleration may be measured by the accelerometers, subject to accelerometer bias, noise and other errors. System velocity and position may be estimated by GPS. GPS provides a solid fix to correct for accelerometer bias and the accelerometers can correct for a limited GPS dropouts. Thus, by proper combination, accelerometer and GPS information may compensate for errors in one another.

Figure 20:
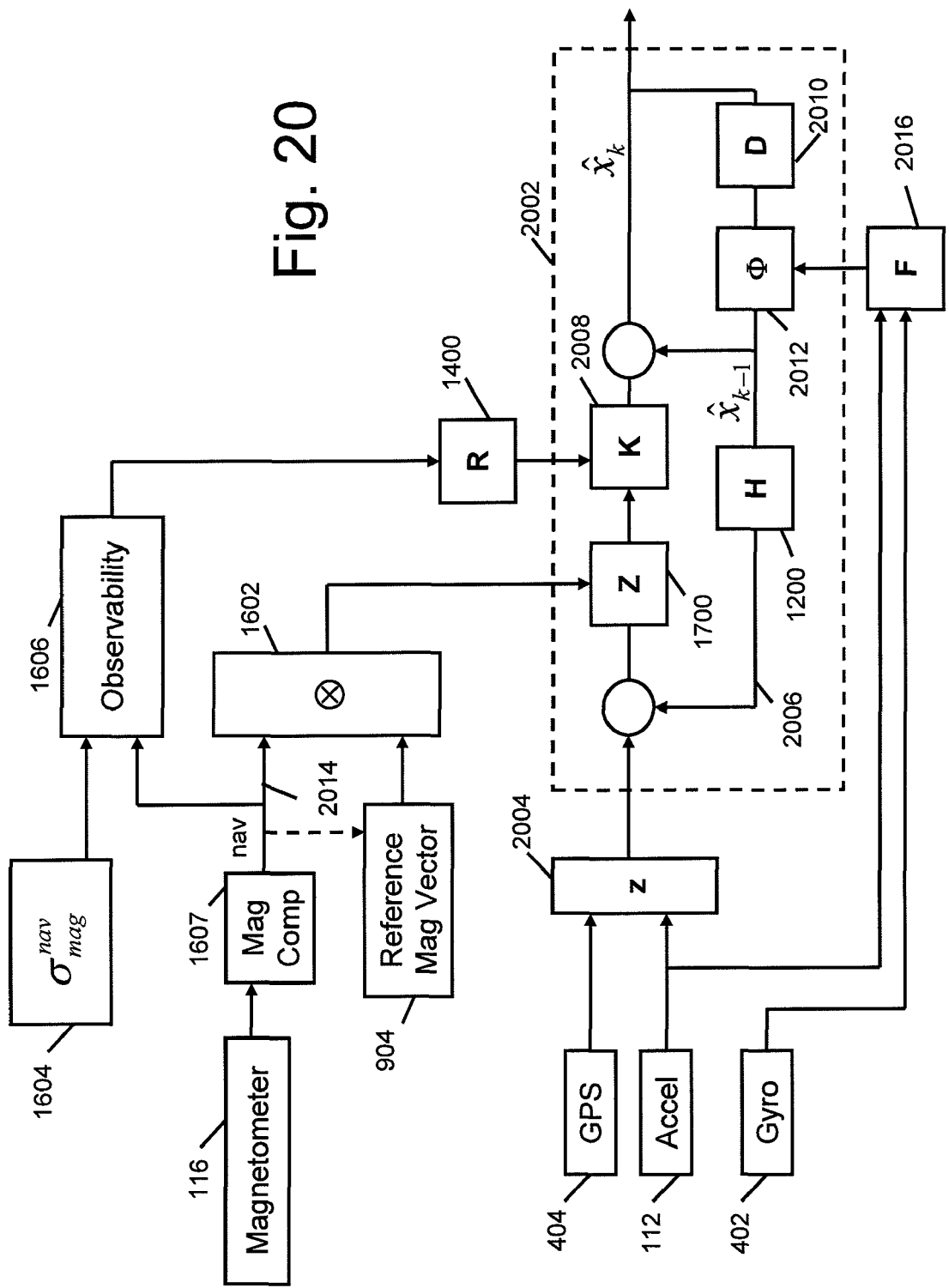
FIG. 20 is a block diagram illustrating the magnetometer inputs to the modified Kalman filter.

FIG. 20 is a block diagram illustrating the magnetometer inputs to the modified Kalman filter. Referring to FIG. 20, a basic Kalman filter 2002 is depicted by the blocks inside the dotted line. Within the Kalman filter, inputs 2004 are compared with estimates 2006 to generate innovations 1700

(measurement residuals). The innovations 1700 are multiplied by the Kalman gain matrix 2008 and summed with prior state estimates $\hat{x}_{k-1}$ to generate new state estimates $\hat{x}_{k1}$. New state estimates are delayed 2010 and applied to the state transition matrix 2012 to generate state estimates for the next cycle. The state estimates are applied through the H matrix 1200 to estimate the inputs 2006 and the cycle continues. Typically measurements are provided to the input z matrix 2004. As shown, the GPS 404 pseudoranges and accelerometer signals 112 are provided to the Kalman filter 2002 via the measuement matrix z 2004. Magnetometer measurements 116, however, require different processing to account for nonlinearity and observability issues related to the magnetometer geometry. The three axis magnetometer 116 is read and then compensated 1607 for offsets, gain, alignment, orthogonality and other errors as necessary. The compensated measurements are then transformed to navigation frame coordinates 2014. A reference magnetic vector 904 may be previously stored by reading the magnetometer at startup or another time as determined by the operator. Alternatively the reference vector 904 may be taken from a database or from memory. The reference vector and the current magnetic vector measurement 2004 are compared using a normalized cross product 1602 to yield a vector representing attitude error (See FIG. 16). The vector is then stored in the Z matrix 1700 in place of the z-Hx estimate for the attitude states. The remaining Z matrix values continue to be processed as normal.

Magnetometer readings 2014 are also provided to the observability calculation 1606 (see FIG. 16). The current magnetic readings 2014 are compared with sensor magnetic noise and uncertainty 1604 and then the comparison is mapped to an R matrix value for each axis. See the discussion of FIG. 16 for details of the comparison and mapping functions. The result is provided to the measurement variance R matrix 1400 in the sub matrix associated with magnetic measurements. Thus, the less observable axes are provided with a higher R matrix value to reduce the effect of the new innovation associated with that axis. The R matrix 1400 is used according to the Kalman filter equations to compute the Kalman gain matrix 2008.

In the embodiment of FIG. 20 the Kalman filter is used to estimate error states. In accordance with this embodiment, the accelerometer and gyro signals are provided to elements of an F matrix 2016 (see FIG. 10A and FIG. 10B), which is used to generate the Φ matrix 2012.

Description of Exemplary Embodiments of the Magnetically Stabilized IMU Component The disclosed systems and methods enable onboard optimal estimation of heading, pitch, and roll through real-time measurement of magnetic field, acceleration and angular motion in three dimensions. More specifically, the systems and methods relate to the use of magnetically-aided IMU's (i.e., inertial/magnetic measurement units) in dynamic environments.

The process uses the earth's magnetic field and inertial measurements to provide accurate onboard estimates of heading, pitch, and roll. This improves compared with prior art systems where only heading error is bound by magnetic aiding. Thus, a device used according to these processes does not have to continually rely on accelerometer data to get roll and pitch (only in remote instances in which either roll or pitch are magnetically unobservable for long periods).

Further, initialization of this system does not necessarily require prior or stored information of the local earth magnetic field (e.g., a geomagnetic map). This improved system instead captures the magnetic field by measurement during the initialization process and then uses this measurement as the reference throughout operation. This assumes that operation is maintained within the bounds of an area in which the earth's magnetic field remains substantially constant. As one skilled in the art will recognize, a significant change in the earth's magnetic field will not be recognized over large distances. Because of this, the geographic area in which accuracy is able to be maintained is very great.

The disclosed embodiments also include a module designed to detect and compensate for dynamic anomalies, or disturbances, caused by nearby magnetic sources such as ferromagnetic material or electric motors.

Some example uses for the disclosed inertial/magnetic measurement devices are in (i) micro-satellites, (ii) small arms, (iii) unmanned ground vehicles, (iv) unmanned air vehicles, (v) gun launched munitions, (vi) missiles, (vii) small passenger aircraft, (viii) robots, (ix) oil drill downhole arrangements, (x) virtual reality devices, (xi), sounding rockets, as well as numerous other bodies in motion.

Various technical terms are used throughout this description. These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a real-time embedded software product that works in combination with physical system components.

Computer-readable media of this software include both volatile and nonvolatile media, removable and non-removable media, and contemplates media readable by a database, a switch, and various other devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 21:
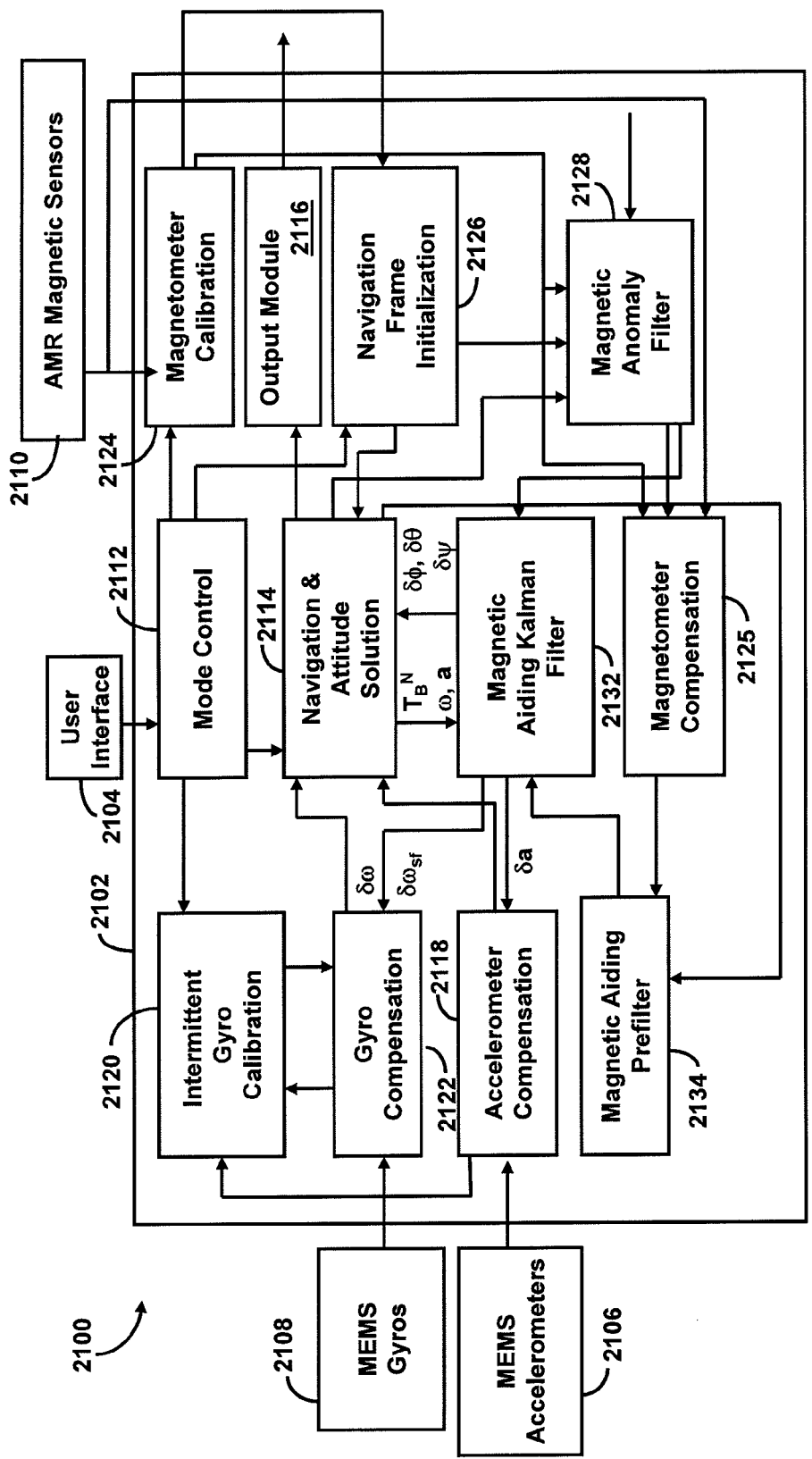
FIG. 21 is a schematic/process flow diagram showing one embodiment of the disclosed system and one embodiment for an environment in which the disclosed processes may be executed.

Exemplary embodiments are disclosed in FIGS. 21 through 25. Referring first to FIG. 21, a schematic diagram of an inertial/magnetic measurement device 2100 for one embodiment of the system is shown. This schematic also includes process information regarding device 2100.

In terms of physical components, device 2100 comprises a processor 2102, a user interface 2104, a MEMs accelerometer triad 2106, a MEMs gyro triad 2108, and a plurality of anisotropic magnetoresistance (AMR) sensors 2110. A plurality of processes are also shown running on processor 2102 in FIG. 21.

User interface 2104, in the preferred embodiment, is a simple user control button arrangement. These kinds of arrangements and the ways in which they are able to interface with processing devices, e.g., microprocessors such as processor 2102 are well known in the art. Other means for interfacing with processors, however, are known in the art, and would fall within the scope of the present invention. Interface 2104 could alternatively be some sort of automated client which is either wired with and travels with the body, or communicates remotely (through some wireless arrangement) with the body to accomplish control. Interface 2104 could also be a digital serial bus, along with power cable (for missile launch applications)

MEMs (Micro-Electronic-Mechanical Systems) accelerometers and gyros have only recently (within the last several years) become developed to the point that they are useable with inertial measurement instruments. Despite their small size and light weight, these devices have proved to be reliable and inexpensive. This makes them adaptable for applications which before would have been too expensive or otherwise unworkable. For example, MEMs devices may make the technologies disclosed herein useable in consumer electronics, gun-launched munitions, and small arms for the military.

The MEMs accelerometer sensor triad 2106 is arranged such that it will measure translational movement (acceleration) and location of a body in three dimensions. In addition to translational movement, MEMs gyro sensor triad 2108 is arranged such that it will measure angular rate in three angular dimensions as well as attitude.

Anisotropic magnetoresistive (AMR) magnetic sensors like those used in plurality 2110 have been used in digital compass devices. Here, they are incorporated into the inertial/magnetic measurement device such that they measure magnetic field in three dimensional space. This field is represented by a three dimensional vector. The AMR magnetic sensors detect not only the magnitude, but also the orientation of the magnetic field, which, absent some anomaly (e.g., alternative sources of magnetism) will not change over time.

These kinds of sensor arrangements involving combinations of accelerometer, gyro, and magnetometer triads—are known to some of those skilled in the art. Further, one skilled in the art will know how to aggregate all three sensor groups—the accelerometers, gyros, and magnetometers, such that processor 2102 can receive readings from them and then process that data. The readings of the accelerometer, gyro, and magnetic sensors are all taken and initially transmitted in analog. The analog signal is converted to digital and then recognized by processor 2102 in a manner known in the art.

Though magnetometers have been used in inertial measurement units before, in the embodiments disclosed herein the magnetic information is used in a different way. The prior art methods use accelerometer data similarly to that of a tilt sensor arrangement. In this kind of arrangement, the accelerometer measurements are used to derive roll and pitch. This is typically followed by an algorithm (which is similar to those used with the conventional digital compass devices) to transform the magnetic measurements into the horizontal plane. This intermediate angle is then compared to a local magnetic heading retrieved from a stored standard magnetic reference map or from an onboard earth magnetic field model. Both approaches require user position information (e.g., latitude and longitude). Heading reference to North is then accomplished by differencing the intermediate heading with the reference magnetic heading. Notice that magnetic field measurements are used only to determine heading—not pitch and roll. This approach also assumes (and requires) a near level orientation.

Here, however, the magnetic measurements are used to determine not only heading, but pitch and roll as well. This resolves the issue of acceleration disturbances in a dynamic motion environment. It also resolves the unobservability problem associated with ballistic (or free-fall) motion. This results in a much more robust and accurate system.

Looking to the processes running on microprocessor 2102, we see that user interface 104 enables interfacing with a mode control process 2112. Mode control process 2112 receives information from interface 2104 and then enables the initiation of several process components running on processor 2102.

Control process 2112 may be used to initiate a navigation attitude solution process 2114. Once this initialization is complete, control process 2114 updates navigation (position and velocity states), as well as heading, pitch, and roll states. This is done by –compensating gyro and accelerometer output; transforming this output to the navigation frame of reference through Euler angles, quaternions, and direction cosine matrices; and integrating the states (i.e. solving a differential equation). Output from navigation attitude solution process 2114 to a system user is accomplished using an output module 2116. Output from this process is also sent to and used in other processes(e.g., an intermittent gyro calibration process 2120 and a magnetometer calibration process 2124).

Output modules like module 2116 are known in the art, and are capable of delivering values for translational acceleration, velocity, positional, angular acceleration, angular velocity, attitude and other derived values so that they can be displayed to a local or remote user in real time.

An accelerometer compensation process 2118 continually receives a body-sensed raw acceleration readings from the accelerometers 2106 in a manner which will be known to those skilled in the art. This compensation process involves the use of acceleration calibration coefficients. These acceleration calibration coefficients, which are determined in the lab by the manufacturer, compensate for known bias and other errors (e.g., scale factors) which cause inaccurate accelerometer measurements.

Another means to bring the compensated value for acceleration closer to true is by estimation using a Kalman filtering process 2132. The Kalman filtering process 2132 generates corrected acceleration biases ($\delta a$) which will be used to further refine the compensated acceleration values. Once compensated values have been reached for acceleration, they are used by both the navigation and attitude solution module 2114 to generate outputs in a manner known to those in the art. The compensated acceleration values are also used by the intermittent gyro calibration process 2122 (which will be discussed in more detail below) to help calibrate gyro information received.

Data including the original body-sensed raw angular rate readings is received by a gyro compensation process 2122. Process 2122 adjusts this data according to manufacturer/lab provided calibration coefficients which strive to account for biases, alignment errors, scale factors and other things which corrupt sensor parameters so that the gyro readings are near true values. This is all standard with most inertial/magnetic measurement devices. Gyro compensation module 2122 then transmits compensated angular rate values to the navigation and attitude solution module 2114. Once the process begins, the calibration coefficients are continually adjusted by Kalman filtering to maintain the compensated angular rate values close to true and filter errors. This is done using Kalman filter corrected values for gyro bias ($\delta \omega$) and for gyro scale factor ($\delta \omega_{SF}$). See FIG. 21. Finally, compensation process 2122 interfaces with intermittent calibration process 2120.

Figure 22:
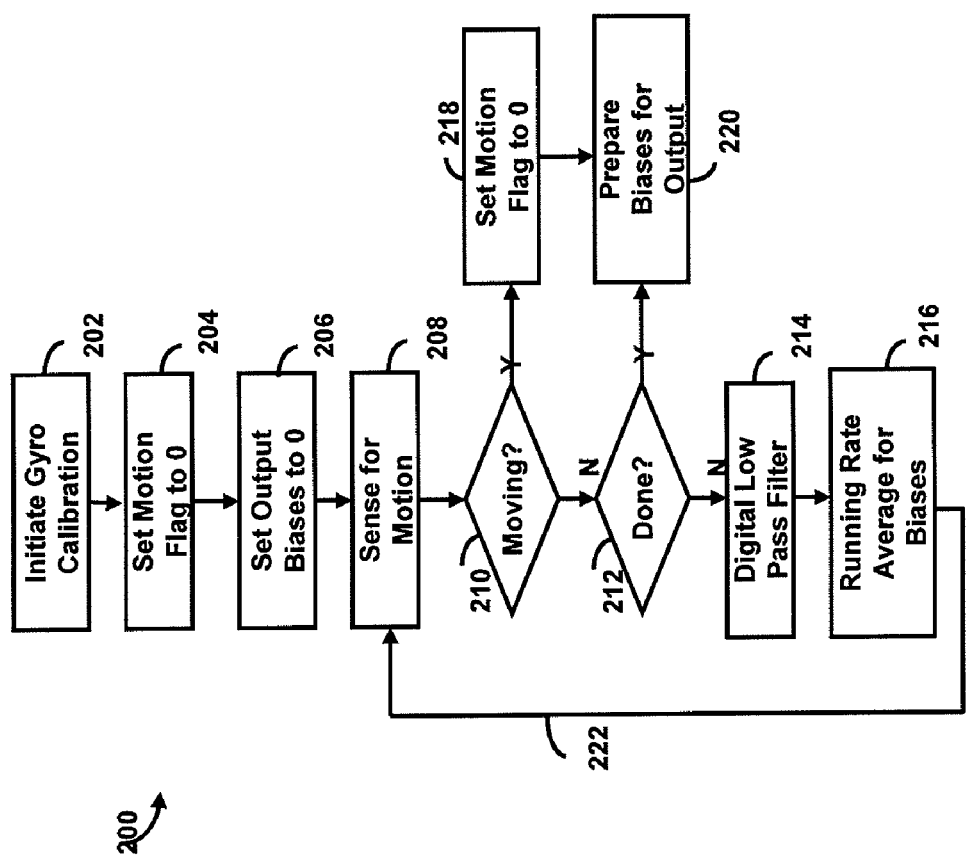
FIG. 22 is a process flow diagram showing the steps in an intermittent-gyro calibration process module of an embodiment.

FIG. 22 shows a process diagram 2200 which discloses the intermittent gyro calibration process 2120 in more detail. Referring to the figure, we see that the process begins in a step 2202 in which it receives an activation signal from user interface 2104. This might occur, when a user activates it by pushing a particular button. This process might also be activated through an onboard detection of a "still environment".

This activation signal initiates the gyro calibration process in a step 2202. Once activation has occurred, a motion flag in the process will initially be set to "0" as shown in a step 2204. This flag will later be changed to a "1" if the body is in motion. These binary identifiers will indicate to the gyro calibration process 2120 whether the body is in motion or not.

Next, in a step 2206, output biases will be zeroed out (set to "0") for the purpose of creating a starting point, thus initializing the bias values. Thus, if the calibration is unsuccessful for some reason (e.g., motion is detected) no bias estimates will ultimately be reported by the FIG. 22 process.

In a next step 2208, the process senses for motion of the body. This is done by monitoring the onboard compensated acceleration from process 118 and also the compensated angular rate from step 2122. If no translational or rotational accelerations are detected, then the answer to a next query step 2210 will be "no."

Given a no answer to step 2210, the process proceeds to a step 2212. In this step an inquiry is made as to whether the user has indicated an end to gyro calibration process 120. The user indicates a desire to terminate by using the pushbutton (or other user interface arrangement) 104 which causes mode control 2112 to transmit a disable signal which will cause intermittent gyro calibration process 2120 to terminate. If a disable signal has not yet been transmitted, the answer at query step 2212 will be "no." This causes the process to proceed on to step 214.

In step 2214, a digital low pass filter is used to attenuate the gyro rate data by suppressing high frequency noise.

Once the data has been filtered, the process continues on to a step 2216 where running rate averages are updated for the bias estimations. These averages are then stored, and the process will continue in a continuous loop 2222 through steps 2208, 2210, 2212, 2214, and 2216 until a "yes" answer is given in either of steps 2210 or 2212. This results in the stored averages for the biases being continually updated which will result in more accuracy over time.

The intermittent gyro process 2120 of FIG. 21 can come to a conclusion in two ways. One way is if either linear acceleration or rotational rates are detected. These indications of body motion will cause the answer to query step 2210 to be "yes." If yes is the answer, and thus, the body is in angular or translational motion, the process then proceeds in a step 2218 the motion flag is set to "1."

Then, in a step 2220, the process outputs the averaged bias data on to the compensation process. The output includes onboard estimates of the gyro biases along with the motion flag information (the "1" indicates to that compensation process that the body is in motion). This indicates to gyro compensation process 2122 that the intermittent calibration process has terminated because the body is in motion.

The second way the FIG. 22 process can end is if the user disables it. Again, this is done using a control button. When this occurs, the answer to the step 2212 query will be "yes" and the process then proceeds to step 2220 where biases for output are prepared and then transmitted to gyro compensation process 2122. An indication that the body is still at rest will also be presented to process 2122 in that the motion flag will still be at "0."

Though the FIG. 22 intermittent gyro calibration process is shown in FIG. 21 as working in cooperation with the other processes disclosed, it should be noted that it is not required that it be combined with all these other processes in order to be useful or operational. One skilled in the art will recognize that this process could also be used separately from numerous other FIG. 21 processes and its inclusion in combination should not limit the scope of the invention to the combination shown.

To further assist the gyro and accelerometer supporting processes, a plurality of their processes are provided which use information received from the AMR sensors and manipulate it to further the objectives of the rest of the system. These processes include a magnetometer calibration process 2124, a navigation frame initialization process 2126, a magnetic anomaly filter process 2128, a magnetometer compensation process 2130, a magnetic aiding Kalman filter process 2132, and a magnetic aiding prefilter process 2134.

As can be seen from FIG. 21, the body sensed raw data is used by two different modules. First it is received by magnetometer calibration module 2124. This process calibrates the magnetic data for system level bias errors. This is done by making a 360 degree rotation in the horizontal plane and a successive 180 degree sweep in the vertical plane. These rotations will allow for observability of the hard core magnetic bias errors in all three axes. The process then outputs onboard calibrated magnetic biases.

These biases, as well as raw magnetic data from 2110 and magnetic anomaly estimates from 2128 are received into the magnetometer compensation module 2125 so that it is able to create a body sensed compensated magnetic field components in a manner known in the art. These components will later, however, be used by the magnetic aiding prefilter 2134 process in a novel manner which will be discussed in greater detail below.

This process is what is used to provide the initial three-dimensional coordinate frame of reference to which the sensed magnetic field be transformed. These axis orientations will later be used as a reference point to compare new body-sensed coordinate values to. Changes in orientation from these initial values will be calculated using Euler angles. Because the earth's magnetic field information is a constant over a wide geographical region, this initialization process eliminates the need for an initial reference frame prior to movement. It also eliminates the need for an Earth magnetic field map or model requiring user position (e.g., latitude and longitude). The reference coordinates will, instead, be the coordinates for the navigation and attitude solution when the initialization process occurs.

Figure 23:
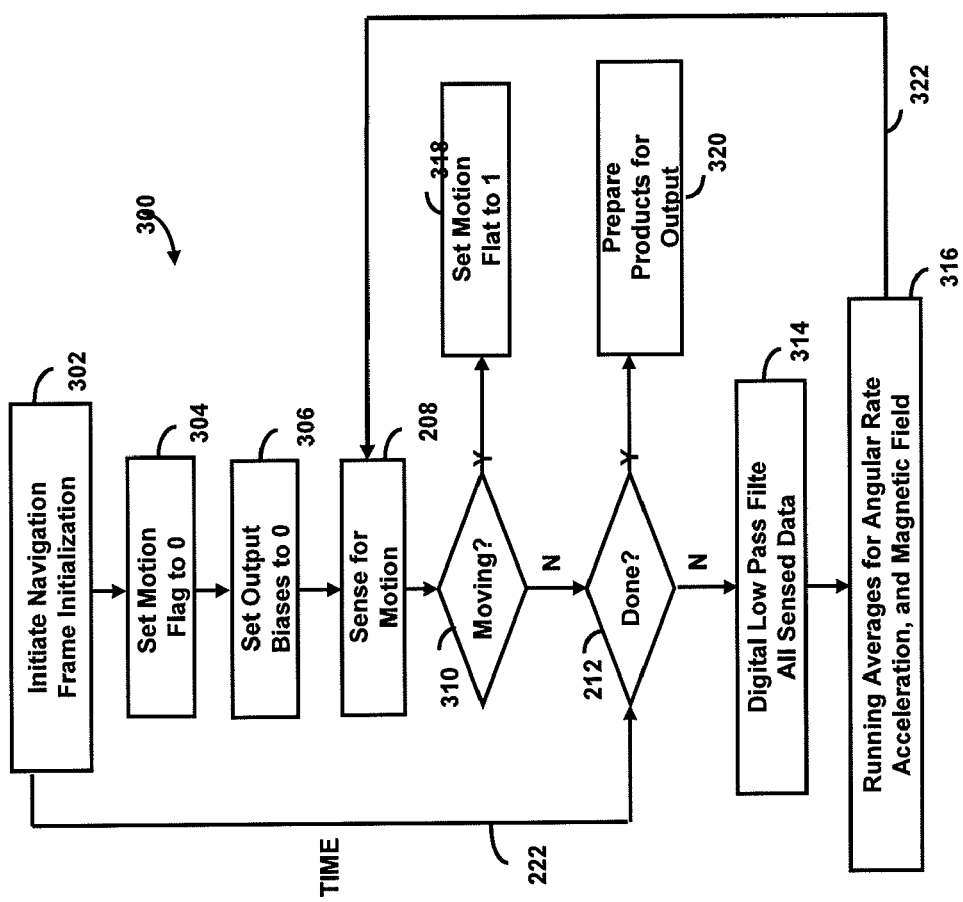
FIG. 23 is a process flow diagram showing the steps III a navigational-frame initialization process module of an embodiment.

The details regarding navigation frame initialization process 2126 (referring to FIG. 21) are shown in a process diagram 2300 shown in FIG. 23. Process 2126 begins in a first step 2302 when an enable signal is received. This will, in the preferred embodiment, come as the result of a user pressing an appropriate control button on user interface 2104. Once this occurs, module 2126 will receive calibrated magnetic data from magnetometer calibration component 2124. These calibrated magnetic component values will be recorded as reference coordinates—creating a coordinate frame to which any future movement can be made relative to.

In prior art processes, the magnetic reference component values were downloaded. This required knowledge of initial position and orientation. But here, because of process 126, this preliminary information is not necessary due to utilization of a frame of reference derived in real-time from accelerometer and magnetometer measurements. This makes the disclosed inertial/magnetic measurement device ideal for on-the-fly usage in bodies for which are in use in the field and thus, do not lend themselves to any particular starting orientation or position. For example, if the body to which the device is a firearm, it would not be necessary to know the initial location and orientation because once the user presses the initialization control button, the navigation frame initialization process 2126 begins and a reference frame is created based on acceleration and magnetic data (which is determined relatively to the direction of gravity) and from which initial Euler angles (pitch and roll) may be calculated.

Referring to the FIG. 23 flow chart, in a step 2304, a motion flag is set to "0." This flag will later be changed to a "1" if the body is in motion.

Next, in a step 2306, the output biases will be zeroed out (set to "0"). By initializing these biases at zero, the FIG. 23 process prevents any prior recorded values from interfering with the accuracy of the process. Especially in situations where motion is detected and thus, the FIG. 23 process will be terminated before running averages are taken (as will be discussed below).

In the next step 2308, the process senses the motion of the body. This is done by monitoring the onboard compensated acceleration from process 118 and also the compensated angular rate from step 2122. If no translational accelerations or rotational rates are detected, then the answer to a next query step 2310 will be "no" and the process will move on to a step 2312.

In step 2312 an inquiry is made as to whether the user has indicated an end to the navigational frame initialization process. The process is timed. The answer to query step 2312 will depend on whether this time has yet elapsed. If not, then the answer to step 2312 will be "no." This causes the process to proceed on to step 2314.

In step 2314, a digital low pass filter is used to eliminate high frequency noise from all sensed data.

Once the data has been filtered, the process continues on to step 316 where running averages are taken for angular rate, acceleration, and the magnetic field. These averages are repeatedly stored as the process transpires in a continuous loop 2322 through steps 2308, 2310, 2312, 2314, and 2316. This will occur until a "yes" answer is given in either of steps 2310 or 2312. This results in the stored averages being continually updated until the process ends.

The navigation frame initialization process 2126 which is shown in detail in FIG. 23 can end in one of two ways. The first way is if either translational accelerations or rotational rates are detected in step 2308. These indications of body motion will cause the answer to query step 2310 to be "yes." If yes is the answer, and thus, the body is in angular or translational motion, the process then proceeds in a step 318 the motion flag is set to "1."

Then, in a step 2320, the process outputs the averaged data (including gyro bias) which is continually saved in step 2316 and passes it on to the navigation and attitude solution process 2114. The information transmitted includes: (i) an initial onboard estimate of gyro biases, (ii) an onboard estimate of initial pitch, roll, and heading, and (iii) the initial magnetic field reference data (e.g., initial gyro bias, initial Euler angles, reference magnitude information). The information also includes the motion flag information (the "1" indicates that the process has terminated because the body is in motion, whereas a "0" would have indicated that the process timed out). Should the returned value of this flag be "1", the process will need to be retried.

The second way the FIG. 23 process can end is if the user disables it. This will be recognized in query step 2312. The answer in step 2312 will be "yes" if a predesignated amount of time has expired. If this has occurred, the process then proceeds to step 2320 where the running averages (initial onboard estimate of gyro biases, pitch, roll, and heading, and the initial magnetic field reference data) saved in step 316 are conveyed to navigation and attitude solution process 2114.

Also conveyed is that the motion flag is still at "0" indicating that the body is still at rest. The biases for output are prepared and then transmitted to gyro compensation process 2122.

Though the FIG. 23 navigation frame initialization process is shown in FIG. 21 as working in cooperation with the other processes disclosed, it should be noted that it is not required that it be combined with all these other processes in order to be useful or operational. One skilled in the art will recognize that this process could also be used for navigational frame initialization purposes separately from numerous other FIG. 21 processes. Its inclusion in combination should not limit the scope of the present invention to any combination shown as it is severable and useable with other motion and/or direction detecting methods which depend on magnetic data.

The earth's magnetic field is typically constant within a limited geographical area and, therefore, normally a good reference. But in reality, local magnetic anomalies can create variation. When the disclosed inertial/magnetic measurement device is mounted on a body, a proximate source of magnetic flux will, unless compensated for, cause inaccurate readings. For example, assuming the inertial/magnetic measurement device is mounted on a small firearm, the passing by of a tank may distort the existing magnetic field and also, thus, device readings. The processes disclosed herein account for such circumstances.

This is done using a magnetic anomaly filter module 2128 which detects changes in magnetic field magnitude and estimates the distortion effects of the anomaly. Though rotation of the body in the uncorrupted magnetic field will cause different magnetic readings in each of the three dimensions, the overall magnetic field magnitude will remain constant. Anomalies, however, will change this magnitude. Thus, the presence of an anomaly will be recognizable by any significant change in magnetic field magnitude. Module 2128, when such an anomaly is recognized, will also alert the Kalman Filter module 2132 that the magnetometer-sensed data is not reliable at that time.

Figure 24:
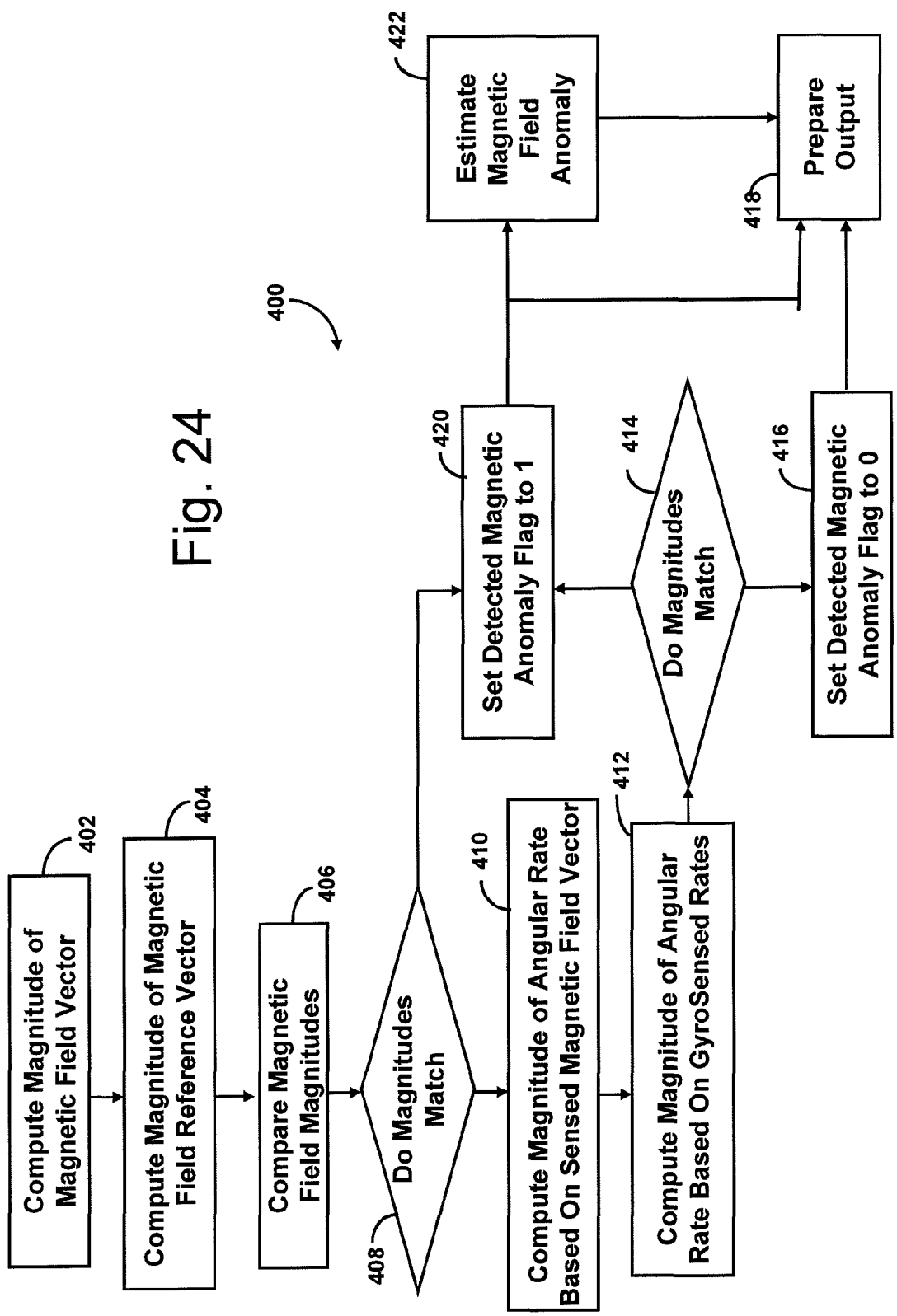
FIG. 24 is a process flow diagram showing the steps in a magnetic-anomaly-filter process module of one embodiment.

The details regarding anomaly filter process 2128 may be seen in a flow diagram 2400 shown in FIG. 24. In a first step 2402, the process compensates the body sensed raw magnetic field components derived from the magnetometers with the magnetic biases estimated in block 2124 to compute the magnitude of the magnetic field vector.

In a next step 2404, the process uses the initial magnetic field reference values which are derived from the FIG. 24 frame initialization process. These values are used to compute the magnitude of the magnetic field reference vector. Under normal circumstances, where no local anomaly exists, the measured magnitude should be nearly equal to the initial magnetic field reference established in step 2126 of FIG. 21.

In a next step 2406, the process compares the computed magnetic field vector magnitude of step 402 to the computed magnitude of the magnetic field reference vector of step 2404. Then, in a query 408, it is determined whether the magnitudes are substantially the same. If so, this is a preliminary indication that the sensed magnetic data is reliable and the process continues on to a step 2410. In step 2410 the magnitude of the angular rate is calculated based on the current and previous sensed magnetic field vector.

Next, in a step 2412, the magnitude of the angular rate is calculated, but in this step the basis for the rates calculated is gyro-sensed. This gyro data is gleaned from the body-sensed compensated angular rate which is available from gyro-compensation module 2120.

In a next step 2414, the magnetic-field rate vector value (as calculated in step 2410) is compared to the gyro-sensed rate vector (as calculated in step 2412) and a determination is made as to whether the magnitudes of each are substantially equal (within a given threshold value). If so, this confirms that the magnetic readings are accurate and not subject to anomaly and the process proceeds to a step 2416 where a flag is set to "0." This flag will later be used by Kalman filter 2132 as an indication that no anomaly exists.

If the magnetic data is subject to some sort of anomaly, this should be picked up in either of query steps 2408 or 2414. If the magnitude of the measured magnetic field vector (calculated in step 2402) does not agree (within a given threshold value) with the magnetic field reference vector (calculated in step 2402), a "no" answer to query 408 directs the process to a step 2420 in which a flag which is indicative of a detected magnetic anomaly to "1."

Similarly, if the magnitude of the angular rates based on the magnetometer-sensed magnetic field vector computed in step 2410 do not substantially match up with the magnitude of the gyro-sensed rates calculated in step 2412, the same process is followed to step 2420 where the flag is set to "1." Regardless of the route the process takes in order to get to step 2420, the "1" flag setting will immediately be output to the Kalman filter process 2132 via output step 2418 so that that process knows anomaly has been detected and that values received should not be given immediate credibility.

Then in a step 2422, an estimate of the magnetic field anomaly is computed. Because the initial reference field is known, anomaly influence is measured by differencing the onboard compensated magnetic field vector with the initial reference field vector. The resultant vector is then sent to step 2418 of FIG. 24. These anomaly component values for the magnetic field data will then be transmitted to Magnetometer Compensation 2125, which converts the anomaly vector to body frame coordinates and removes it from the current measured magnetic field.

Though the FIG. 24 magnetic anomaly filtration process is shown in FIG. 21 as working in cooperation with the other processes disclosed, it should be noted that it is not required that it be combined with all these other processes in order to be useful or operational. One skilled in the art will recognize that this process could also be used for the detection and filtration of magnetic anomalies in other environs and processes. Thus, the inclusion of the FIG. 24 process in FIG. 21 as process 2128 should not limit the scope of the present invention to any combination shown as it is severable and useable with other motion and/or direction detecting methods which make use of magnetic data.

Magnetic aided Kalman filter 2132 works in cooperation with navigation and attitude solution 2114 and other system components to use models of what has occurred in the past and then uses these past models to determine the accuracy of present readings by the sensors. With respect to its functions in cooperation with solution process 2114, Kalman filter 2132 receives the body to navigation direction cosine matrix ($T_B^N$), the body-sensed angular rate ($\omega$), and the body sensed acceleration (a), and responds with filter corrections for roll, pitch, and heading ($\delta\phi$, $\delta\theta$, and $\delta\psi$ respectively). These Kalman filter processes will be known to those in a manner known to those skilled in the art.

One skilled in the art will recognize that Kalman filter arrangements have been used in the past for the estimation of navigation and attitude solution outputs which are close to actual based propagation and estimation using historical data and current gyro and accelerometer readings. Here, Kalman filter 2132 is also used to evaluate and process magnetic data. A novel magnetic aiding prefilter 2134 is provided to enable operation of this custom Kalman filter.

Referring back to FIG. 21, magnetic aiding prefilter 2134 receives: (i) the body sensed compensated magnetic field data from magnetometer compensation process 125, (ii) the body-to-navigation frame transformation matrix values, and (iii) the initial magnetic field in the navigation frame from the navigation and attitude solution module 2114, and manipulates these three inputs to aid Kalman filter 2132 with magnetic information for modeling purposes. This helps to improve attitude error estimates and gyro bias error estimates.

Figure 25:
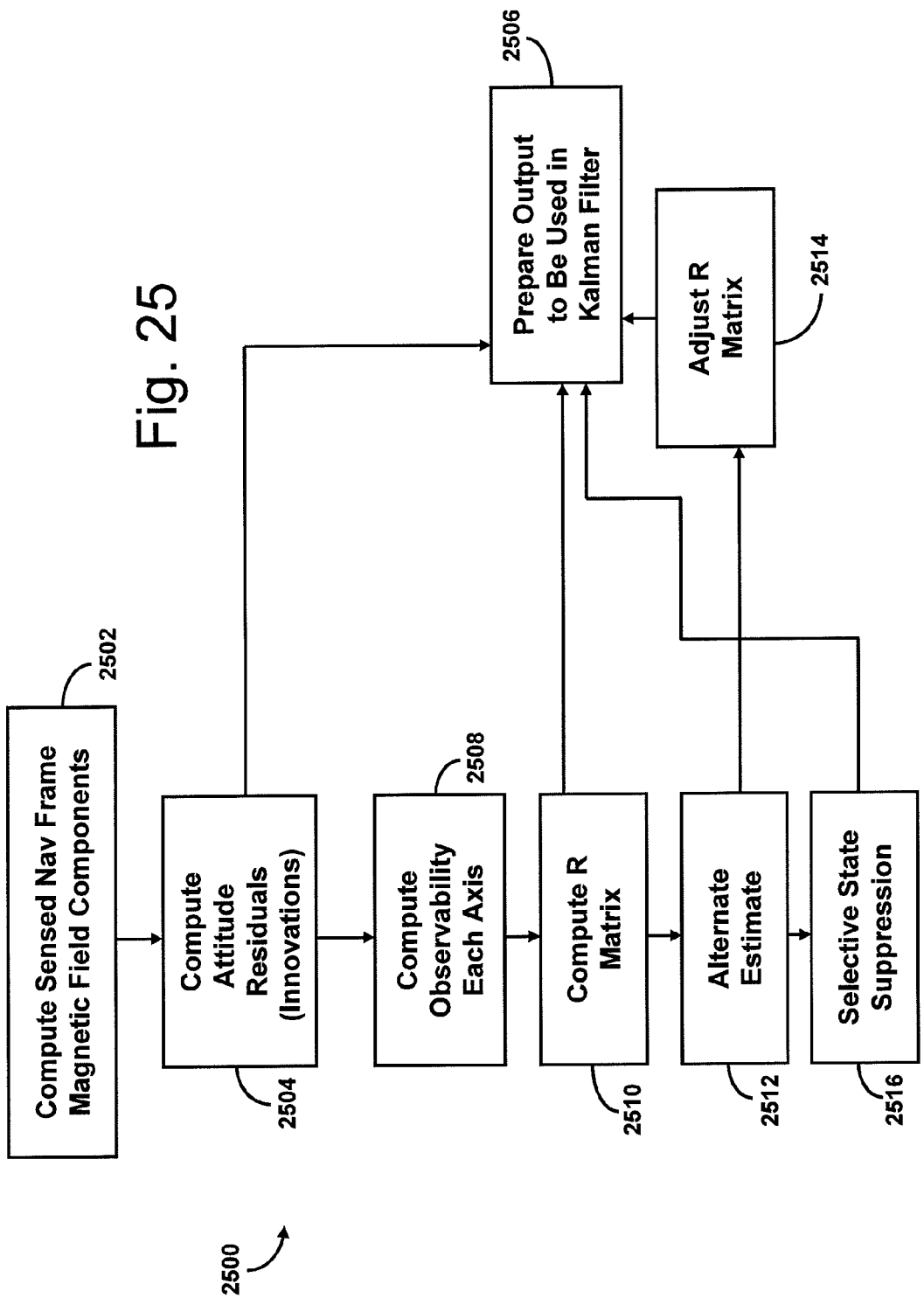
FIG. 25 is a process flow diagram showing the steps in a magnetic aiding prefilter process module of one embodiment.

The specifics regarding operation of the magnetic aiding prefilter 2134 are illustrated in a process flow diagram 2500 which is shown in FIG. 25. In a first step 2502 the process computes the sensed navigational frame magnetic field components. This is done using: (i) the onboard estimate of body to navigational transformation matrix from 2114 of FIG. 21 and (ii) the body-sensed compensated magnetic field components from 2125 of FIG. 21. The magnetic field in the navigational frame is computed by multiplying the onboard estimate for the body to navigation transformation matrix by the body-sensed compensated magnetic field vector.

Once the body-sensed magnetic field has been transformed to the navigation frame, the process moves on to step 2504 where attitude residuals (also called innovations) are calculated. To do this, the process performs a vector cross product operation of the initial magnetic field reference (from navigational frame initialization process 2300 from the navigation and attitude solution module 2114) and the current measured magnetic field vector computed in step 2502. The cross product of these two vectors has a strong correlation to the three dimensional attitude error vector. These residuals (innovations) are then prepared for, and output to be used in Kalman filter process 2132 in a step 2506.

Next, in a step 2508, a measure of observability for each attitude axis (roll, pitch, yaw) is generated as a function of the angle between the magnetic field vector and each body axis. The angle is calculated by utilizing the vector dot product of each body axis with the vector composed of the initial reference magnetic field. Thus, it is the cosine of the scalar angle between the reference magnetic field vector and the given axis. The observability is maximized when this angle is 90°. The observability calculated is indicative of how well magnetically sensed attitude errors are being recognized.

Now that the observability has been determined for each rotational axis, a measurement-noise covariance matrix ("R matrix") is computed by a mapping process in a step 2510. In a first alternative, the mapping process is 1:1, i.e., the normalized dot product (cosine of the angle between the reference magnetic field and the given axis) is used directly. In a second alternative, step 2510 uses semi-empirical data which is generated through simulations. Such data relates the observability angle just discussed with angle measurement uncertainty. Thus for a given observability angle, a number of simulations may be run using different R matrix values. The R matrix value giving the best results becomes a table lookup value for that associated observability angle. This allows for mapping between the observability angle and the Kalman measurement noise covariance matrix (R matrix) diagonal elements. The R matrix is then, in step 2506, output to the Kalman filter, where it is used according to known Kalman processes.

In a third alternative embodiment, the observability angle is mapped to the R matrix value by the relations shown in FIG. 16. In FIG. 16 the residuals are found as the sine of the angle between the reference magnetic vector and the currently measured magnetic vector. The sine value is determined by taking a normalized cross product of the reference magnetic vector and the sensed magnetic vector.

Referring again to FIG. 25, next, in a step 2512, if the axis of poorest observability is below a minimum threshold the process applies alternate methods, if the conditions allow: by using accelerometer measurements to pitch and roll estimates if near level; by using magnetic compass algorithm for heading if both pitch and roll observabilities are sufficient. These alternative methods are known in the art (e.g., those used in U.S. Pat. Nos. 6,516,283 and 6,522,992). Another alternative method is described as a numerical search for Euler angles errors that give rise to a match with the sensed magnetic field vector. Either method could be used as an optional alternative way of estimating in the case observability is poor in a particular axis over a certain duration limit.

The alternate estimate process of step 2512 may be enabled by using a flagging process much like those already described above. In such a case, a "1" or "0" flag would be passed on after step 2510 indicating whether a need exists for the alternate estimations caused by poor observability.

If the alternate estimate application is enabled, the R matrix diagonal elements are adjusted accordingly. This is not done for all the diagonal elements, but instead, only for the ones of the poorest observability. Then, in output step 2506, these adjusted measurement noise parameters are prepared for and output to Kalman process 2132.

Step 2516 provides for selective state suppression of the Kalman filter state estimates associated with very poor measurement observability. Like with alternate estimate step 2514, this step functions, or not, in response to a flag (a "1" or "0") received from the process. When the observability is below threshold values for certain parameters, this step simply zeros out the corrections so that they will not be fed back to the Navigation & Attitude Solution (module 114 of FIG. 21) nor to the Accelerometer Compensation (module 2118 of FIG. 21) nor to the Gyro Compensation (module 2122 of FIG. 21).

Though the FIG. 25 magnetic aiding prefilter process 2134 is shown in FIG. 21 as working in cooperation with the other processes disclosed, it should be noted that it is not required that it be combined with all these other processes in order to be useful or operational. One skilled in the art will recognize that this process could also be used in cooperation with Kalman filters in other environments and with other processes. Thus, its inclusion FIG. 21 should not limit the scope of the present invention to any combination shown as it is severable and useable with other motion and/or direction detecting methods which use magnetic data.

Magnetic Anomaly Detection

In one embodiment, a magnetic anomaly may be determined by detecting a change in the earth's magnetic vector as measured in the navigation frame. The detected change may be a magnitude change and/or an angle change. Initially, a reference value of the earth's magnetic vector may be recorded for the operational area at start up or another time during the operation of the unit. In order to ensure there are no anomalies during the reference measurement, the operator may first observe that no nearby objects are present that would distort the earth's magnetic field and may enter that information to allow the system to take a reference measurement. During normal operation, the system transforms body magnetic vector information to the navigation frame and compares with the reference vector. If a change in magnitude or a change in direction is noted, the system would enter a magnetic anomaly mode, wherein the system would reduce or eliminate the authority of the magnetic information. During the magnetic anomaly mode, the system would rely on IMU information aided by GPS until the anomaly clears. Upon entering anomaly mode, the operator may be notified of the condition and may be provided a monitor display to help determine the magnitude and direction of the error to help in locating and eliminating the error source. During a short anomaly condition, the system may maintain full performance and accuracy; however, as gyro drift accumulates, the system may impose limitations, such as requiring a stable mount to maintain full accuracy and may notify the operator of the condition. Once the anomaly condition clears, the magnetic information may be relied upon again and full capability restored.

In one embodiment, the threshold for detecting an anomaly may be 20 milligauss (mG) for a system operating in a typical earth's field intensity of 0.5 gauss, i.e., the change in magnitude of the current measurement compared with the reference measurement of greater than ±20 mG (milligauss) would be considered an anomaly. The value of the threshold should be high enough so that it will not trigger for normal movements and orientations of the system, but low enough to trigger upon detecting an anomaly that would cause unacceptable performance.

In an alternative embodiment, the detection of an anomaly may invoke a gradual and proportional reduction in authority of the magnetometer information, i.e. the magnitude of the difference between the reference vector and the current measurement may be used to reduce the authority of the magnetic information. A convenient way to implement this reduction is to increase the covariance of the magnetic information in a Kalman filter implementation to reduce the magnetic information authority. For example, the covariance may be set $$R_n = a|m-r| + a_0,$$

where, $R_n$ is the covariance for the magnetic vector measurements,
m is the magnetic vector measurement,
r is the reference magnetic vector,
|.| finds the magnitude,
a is a scale factor to set the rate of authority reduction, and
$a_0$ is the desired covariance for no anomaly.

Thus, if a0=2 for no anomaly, a value of a=100 would double Rn for a 20 milligauss difference between the measurement m and the reference r, (i.e., a |m−r|=2) and would yield a value of Rn=102 for a 1 gauss difference, essentially shutting off the magnetic sensor input. In a further alternative, the factor "a" instead of being the linear proportionality factor as shown, could be a polynomial or other function to shape the transition curve as desired.

Detection in moving mode. In moving mode, magnetic anomalies may still be detected. The attitude vector is primarily established by the gyros and the magnetic vector is used to correct gyro bias. Thus, a change in the magnetic vector which is faster than gyro bias uncertainty will result in a deviation of the magnetic vector in the gyro reference frame. When the deviation exceeds a predetermined threshold, an anomaly condition may be declared by the software.

Gravity Vector Estimation

The gravity vector is the fundamental axis defining azimuth and elevation. Gravity is initially estimated when in stationary mode. Stationary mode is entered upon measuring a constant g vector for a predefined period of time, e.g., within 1 mr (milliradian) for 10 seconds. Optionally or alternatively a gyro measurement below a threshold of motion sufficient to exclude gyro noise and unknown bias may also be used to initiate stationary mode. In stationary mode, the accelerometer vector is filtered for a period of time and the mean is taken to be the gravity vector. The magnetic vector may also be filtered to establish a reference magnetic vector. The angle between the magnetic vector and the gravity vector is recorded.

Stationary mode is exited to moving mode as soon as rotational or lateral motion is detected by the gyros or accelerometers. In moving mode, reference vertical attitude is maintained by the gyros with integrated gyro states constrained by the low noise magnetic vector measurements. Integrated gyro error relative to the magnetic vector can be fed back to correct gyro bias. In moving mode, accelerometer measurements may be ignored or alternatively may be contributed to the solution at a low gain by associating a high covariance value to the measurements.

GPS Aiding

In one embodiment, GPS is not required because an alternative source of the observation location coordinates may be available or the observation location may be a reference location. In one embodiment, an inertial navigation system may provide the coordinates of the observation platform. In another embodiment, distance and direction are determined to a known location to determine the coordinates of the observation platform. In a preferred embodiment, however, GPS or an equivalent navigation system may be used to advantage to provide a coordinate location for the observation platform. In addition, GPS can provide position, velocity, and direction of movement information that may be used to correct IMU errors. Some GPS receivers include magnetic north correction information as a database of previously determined values, enabling the determination of true north from magnetic north. Alternatively, GPS may be used to survey locations in GPS coordinates that may be observed by the target location system to determine true north.

In one embodiment, GPS is used to obtain low noise acceleration, velocity, and position measurements of the observation platform that may be compared with accelerometer measurements to reduce accelerometer errors. GPS acceleration information may be used to better estimate the gravity vector by subtracting accelerations. A lower noise gravity vector estimate may then contribute more heavily to the attitude estimate, even in moving mode.

Summary of Modes

As described above, the following represent exemplary modes of operation. Other modes may be added and these modes may be varied and/or combined by one of ordinary skill in the art in accordance with the teachings herein.

Stationary mode is entered when the platform is fixed with respect to accelerations, such as when mounted on a tripod. Absent lateral accelerations, the accelerometers provide accurate measurement of the earth's gravity vector.

Stopped mode is stationary and without rotation motion. In stopped mode gyro bias may be determined directly, although g-sensitive errors will be unknown.

Moving mode 1 is with a human operator holding the device free of a tripod.

Moving mode 2 is being transported by vehicle.

Magnetic reference mode, the reference magnetic vector and magnetic to gravity angle are measured. Magnetic reference mode is preferably also stopped mode. Magnetic reference is typically entered by operator command upon startup.

Magnetic calibration mode is entered to correct magnetometer bias and other errors. The system is placed through a sequence of rotations in azimuth and elevation to exercise all angles. Gyro data is used to measure the rotations and compare with magnetic data to calculate magnetic bias and misalignments.

Moving mode, attitude is determined from gyro rotation data and mag vector data. Slow differences between magnetic vector and gyro data are used to correct attitude and gyro bias. Fast differences are used to detect a magnetic anomaly. Accelerometer data may be filtered to produce a gravity estimate and used for attitude based on magnitude of motion.

Magnetic anomaly mode reduces or disconnects magnetic data from attitude determination.

In Kalman filter embodiments, data sources may be turned off/on or varied in influence by modifying the R matrix or alternatively by modifying the innovations (measurement residual $y=z-Hx$).

New System Applications Enabled by the Magnetically Stabilized Target Location System Magnetic vector sensing thus enables target location in a very small package by utilizing a very small range finder and small light weight IMU. This opens up a new field of applications including but not limited to a helmet mounted location system, binocular location system, rifle mounted location system and others. In one embodiment, the location system may be integrated with a shoulder mounted missile system. The target location may be used locally or transmitted to another unit, or both. One such system is shown in FIG. 25 and FIG. 26.

FIG. 25 is an exemplary weapon system in sender mode including an integrated target location system. FIG. 25 shows the target location system comprising gyros 402, accelerometers 112, magnetometers 116, GPS 404 and laser range finder 118. The target location system includes the position and attitude estimator 2502 for the platform position. Platform position, velocity, and attitude is provided to the fire control processor 2506 of the weapon system. The fire control processor 2506 may complete the computation of target location and compute trajectory information for the missile. Alternatively, as shown in FIG. 25, the fire control processor 2506 may operate in sender mode wherein the target position information 2508 may be relayed by radio 2504 or other means to another unit which actually launches the missile. The second unit may be out of line of sight with the target.

FIG. 26 illustrates a second unit operating in receiver mode. The first unit of FIG. 25 and second unit of FIG. 26 may be identical units fully independently functional, or may be reduced to the functions as illustrated. FIG. 26 shows the unit in receiving mode utilizing the gyros 402, accelerometers 112, magnetometers 116 and GPS 404 to estimate 2504 platform attitude and position. The laser rangefinder may be present, but is not utilized. The target position information 2508 is received by the radio 2504 and combined with platform attitude in the fire control processor 2506 to generate pointing information for launch of the weapon 2510. The pointing information is communicated to the operator via a display 2512.

In a further alternative, a passive rangefinder may be used in place of the active laser rangefinder. The passive range finder may utilize a pair of cameras offset at a known distance. In one such embodiment, the first unit of FIG. 25 and second unit of FIG. 26 may both be fitted with cameras (not shown) to triangulate on the target to solve for target position. Each unit would allow the respective operator to view video and identify the target in the scene. One or both operators may also view video from the other unit to help confirm identification of the same target in both units. Identification of the target by both operators during the same time interval would initiate the target position calculation.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for determining a position of a target comprising:
   (a) an inertial measurement unit, said inertial measurement unit comprising:
      a triad of rate gyros mounted to a reference platform, each gyro of said triad of rage gyros having a respective rotational sensing axis; and
      a triad of accelerometers mounted to said reference platform;
   (b) a three-axis magnetic sensor mounted to said reference platform for sensing the earth's magnetic field;
   (c) a position source for determining a coordinate position of the reference platform;
   (d) a target sighting device, said target sighting device aligned with said inertial measurement unit and said three-axis magnetic sensor, said target sighting device for finding angle coordinates defining a line from said reference platform to said target;
   (e) a target distance determination device for determining target distance from said reference platform along said angle coordinates; and
   (f) a state estimation processor for combining data from the triad of rate gyros and the triad of accelerometers with data from the three axis magnetic sensor to generate platform attitude information; said state estimation processor utilizing three axes of said three axis magnetic sensor to correct errors in said platform attitude information;
   wherein said position of said target is computed based on said coordinate position of the reference platform summed with a position vector having a length according to said target distance determination device and said position vector having a vector direction in accordance with said angle coordinates defining said line from said platform to said target, said angle coordinates in accordance with said platform attitude information.

2. The system of claim 1, wherein gyro bias for at least on gyro of said triad of rate gyros is corrected based on said data from said three axis magnetic sensor.

3. The system of claim 1, wherein a bias for at least one gyro of said triad of rate gyros is corrected based on a three axis measurement of the earth's magnetic vector by the three axis magnetic sensor, said correction in accordance with the observability of each gyro rotation sensing axis relative to the three-axis measurement of the earth's magnetic vector.

4. The system of claim 1, wherein magnetic information is ignored upon detecting a magnetic anomaly.

5. The system of claim 4, wherein the magnetic anomaly is determined by detecting a change in the magnitude of the earth's magnetic field over an interval of time.

6. The system of claim 4, wherein the magnetic anomaly is determined by detecting a change over an interval of time in the direction of a sensed magnetic field vector as transformed to a navigation frame.

7. The system of claim 1, wherein the target distance measuring device is a passive distance measuring device.

8. The system of claim 1, wherein the range measuring device is an active distance measuring device comprising a laser range finder or a radar range finder.

9. The system of claim 8, further including an operator input to signal when optical aiming system is observed being superimposed on a target to start a target position measurement process.

10. The system of claim 1, further including a computer video based target observation device running a target recognition process to identify the target and provide target location information relative to the video frame, and the system includes said target location information relative to the video frame do determine target location in map coordinates.

11. The system of claim 10, further including a target tracking process to track the target after the target is identified.

12. A method for determining a position of a target comprising providing a target position measurement system having a computer embedded therein performing the steps of:
   determining the location coordinates of an observation position;
   determining an attitude estimate of a system reference platform at said observation position, said attitude estimate including an azimuth estimate and a vertical attitude estimate;
   said determining said attitude estimate performed with reference to:
   a three-axis rate gyro triad sensing body motion of said reference platform,
   a three-axis accelerometer triad sensing the earth's gravity vector and sensing body motion of said reference platform,
   a GPS receiver providing position and velocity information of said reference platform, and
   a three-axis magnetic sensor mounted to said reference platform for sensing the earth's magnetic field, said determining said attitude estimate including the step of correcting said vertical attitude estimate based on said three-axis magnetic sensor;
   said target position measurement system further performing the steps of:
   determining a line of sight direction from said reference platform to said target, said line of sight direction including angle coordinates relative to said reference platform;
   determining a distance to said target along said line of sight direction; and
   extrapolating from said observation position along said line of sight direction by said distance to said target to determine said target position.

13. The method of claim 12, wherein the navigating step includes:
   correcting a bias of at least one gyro of said three-axis rate gyro triad by using a three-axis measurement of the earth's magnetic field by the three-axis magnetic sensor.

14. The method of claim 12, wherein the navigating step includes:
   correcting a bias for at least one gyro of said triad of rate gyros using a three-axis measurement of the earth's magnetic vector by the three-axis magnetic sensor, said correction in accordance with the observability of a gyro rotation sensing axis relative to the earth's magnetic vector measurement.

15. The method of claim 12, wherein the step of correcting said vertical attitude based on said three-axis magnetic sensor comprises the steps of:
   transforming a three dimensional body referenced measurement from said three-axis magnetic sensor to a navigation frame representation of the earth's magnetic vector, and
   comparing said navigation frame representation of the earth's magnetic vector to a reference magnetic vector to generate a three dimensional comparison value; and
   correcting said vertical attitude estimate based on said three dimensional comparison value.

16. The method of claim 12, wherein magnetic information is ignored upon detecting a magnetic anomaly.

17. A system for determining a position of a target comprising
   (a) an inertial measurement unit, said inertial measurement unit comprising: a level sensor having at least two axes mounted to said reference platform;
   (b) a three axis magnetic sensor mounted to said reference platform for sensing the earth's magnetic field;
   (c) a position source for determining a coordinate position of the reference platform;
   (d) a target sighting device, said target sighting device aligned with said inertial measurement unit and said three axis magnetic sensor, said target sighting device for finding angle coordinates defining a line from said reference platform to the target;
   (e) a target distance determination device for determining target distance from said reference platform along said angle coordinates; and
   (f) a state estimation processor for combining data from the level sensor with data from the three axis magnetic sensor to generate platform attitude information;
   wherein said position of said target is computed based on said coordinate position of the reference platform summed with a position vector having a length according to said target distance determination device and said position vector having a vector direction in accordance with said angle coordinates defining said line from said platform to said target, said angle coordinates in accordance with said platform attitude information; and
   wherein the level sensor and three axis magnetic sensor provide redundant vertical information that cooperates to generate elevation axis information for said line from said reference platform to said target.

18. The system of claim 17, wherein the state estimation processor includes a Bayesian estimator, a Kalman estimator, a maximum likelihood estimator, or a mean square estimator.

19. The system of claim 18, further including a rate gyro triad mounted to said reference platform.

20. The system of claim 19, wherein the level sensor comprises one or more accelerometers.

21. The system of claim 20, wherein the position source means for determining the coordinate position of the reference platform comprises a GPS receiver.

22. The system of claim 21, wherein the state estimation processor is a Kalman estimator configured to estimate attitude error and an attitude residual is calculated based on a normalized vector cross product between a body referenced three axis magnetic measurement transformed to a navigation frame and a reference navigation frame magnetic vector.

23. The system of claim 22, further including a Kalman gain adjustment for observability of the attitude error based on a comparison between an uncertainty value for each magnetic axis and the measured magnitudes of the other two axes of the three axis magnetic sensor.

24. The system of claim 23, wherein the gain adjustment is provided by setting the magnetic sensor values for a Kalman measurement covariance matrix according to said comparison between said uncertainty value and said measured magnitudes.

* * * * *